US011228972B1

(12) United States Patent
Marupaduga et al.

(10) Patent No.: US 11,228,972 B1
(45) Date of Patent: Jan. 18, 2022

(54) MEASUREMENT TIME PERIOD BASED ON LOCATION RADIO METRIC VARIANCE

(71) Applicant: T-MOBILE INNOVATIONS LLC, Overland Park, KS (US)

(72) Inventors: Sreekar Marupaduga, Overland Park, KS (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/017,161

(22) Filed: Sep. 10, 2020

(51) Int. Cl.
*H04W 48/20* (2009.01)
*H04W 24/10* (2009.01)
*H04W 64/00* (2009.01)
*G01S 13/76* (2006.01)

(52) U.S. Cl.
CPC .......... *H04W 48/20* (2013.01); *G01S 13/765* (2013.01); *H04W 24/10* (2013.01); *H04W 64/00* (2013.01)

(58) Field of Classification Search
CPC ................................. H04B 17/27; G01S 5/06
USPC ........................ 455/452.1, 423; 370/241, 335
See application file for complete search history.

(56) References Cited

U.S. PATENT DOCUMENTS

| 7,313,116 | B2 | 12/2007 | Lee et al. |
| 7,535,846 | B2 | 5/2009 | Kim et al. |
| 8,831,590 | B2 | 9/2014 | Nosley et al. |
| 9,344,943 | B2 | 5/2016 | Teyeb et al. |
| 9,794,849 | B2 | 10/2017 | Liang |
| 10,182,430 | B2 | 1/2019 | Futaki |
| 10,484,890 | B2 | 11/2019 | Lin et al. |
| 2008/0014957 | A1 | 1/2008 | Ore |
| 2019/0320337 | A1* | 10/2019 | Siomina ................ H04W 24/10 |

OTHER PUBLICATIONS

U.S. Appl. No. 16/109,255, filed Aug. 22, 2018.

* cited by examiner

*Primary Examiner* — Kiet M Doan

(57) ABSTRACT

Baseband circuitry receives and processes measurement reports from multiple User Equipment (UEs) at multiple locations and responsively determines radio metric variances at the multiple locations. The baseband circuitry receives attachment signaling from a new UE, determines the location for the new UE, and determines a measurement time period for the new UE based on the radio metric variance at the location of the new UE. The baseband circuitry transfers the measurement time period to the new UE. The baseband circuitry receives and processes a measurement report from the new UE and determines to add a secondary access node based on a radio metric for the secondary access node in the new measurement report. The baseband circuitry transfers network signaling to the secondary access node to serve the new UE and transfers additional user signaling to new UE to attach to the secondary access node.

18 Claims, 12 Drawing Sheets

MEASUREMENT TIME PERIOD BASED ON LOCATION RADIO METRIC VARIANCE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN). In some examples, both LTE and 5GNR networks serve the same wireless user device at the same time with an integrated data service called dual-connectivity.

A wireless access node that provides dual connectivity simultaneously serves a single user device over parallel wireless links. An Evolved Universal Terrestrial Radio Access Network Dual Connectivity (EN-DC) node comprises both a primary access node and one or more secondary wireless nodes. An EN-DC user device initially attaches to the primary access node in the EN-DC node. The primary access node transfers measurement instructions to the EN-DC user device that direct the EN-DC user device to measure signal strength and signal quality for the secondary access node(s). The measurement instructions include a measurement parameter referred to as "Time-To-Trigger". The Time-To-Trigger (TTT) specifies a period of time the EN-DC user device will measure the signal strength for the secondary access node(s). The EN-DC user device receives the measurement instructions and measures the signal strength of the 5GNR gNodeB for the period of time specified by the TTT.

The EN-DC user device reports the signal strength for the secondary access node(s) to the primary access nodes. The primary access node determines if the secondary access nodes should be used to serve the EN-DC user device based on the secondary access node signal strengths. To determine if the secondary access node(s) should be used, the primary access node compares received signal strengths for the secondary access node(s) at the EN-DC user device to a threshold that is referred to as "B1". The primary access node may also consider frequency offset and hysteresis for the secondary access node(s) along with signal strength. When the length of time specified by the TTT is too short, the EN-DC user device cannot accurately measure the signal strength for the secondary access node(s). When the EN-DC user device cannot accurately measure the secondary access node signal strengths, the primary access node cannot effectively compare the received signal strengths at the EN-DC user device to the B1 threshold.

Unfortunately, the wireless access nodes do not effectively and efficiently mitigate inaccurate signal strength measurements caused by inadequate TTT measurement time periods.

TECHNICAL OVERVIEW

A primary access node adds a secondary access node to deliver a wireless communication service to a wireless UE. The primary access node comprises a radio and baseband circuitry. The radio wirelessly receives measurement reports from a sample set of User Equipment (UEs) characterizing a radio metric for the secondary access node and transfers the measurement reports to baseband circuitry. The baseband circuitry processes the measurement reports and responsively determines radio metric variances at different locations. The radio wirelessly exchanges user signaling with a new UE and exchanges the user signaling with the baseband circuitry. The baseband circuitry determines the locations for the new UE and determines a measurement time period for the new UE based on the radio metric variance at the location of the new UE. The baseband circuitry transfers the measurement time period to the radio and the radio wirelessly transfers the measurement time period to the new UE. The new UE measures a wireless signal from the secondary access node for the measurement time period to generate a new measurement report. The radio wirelessly receives the new measurement report from the new UE that indicates the radio metric for the secondary access node and transfers the new measurement report to the baseband circuitry. The baseband circuitry processes the new measurement report and determines to add the secondary access node based on the radio metric for the secondary access node in the new measurement report. The baseband circuitry transfers network signaling to the secondary access node to serve the UE and transfers additional user signaling to the new UE to attach to the secondary access node. The secondary access node delivers the wireless communication service to the new UE responsive to the network signaling.

DETAILED DESCRIPTION

Figure 1:
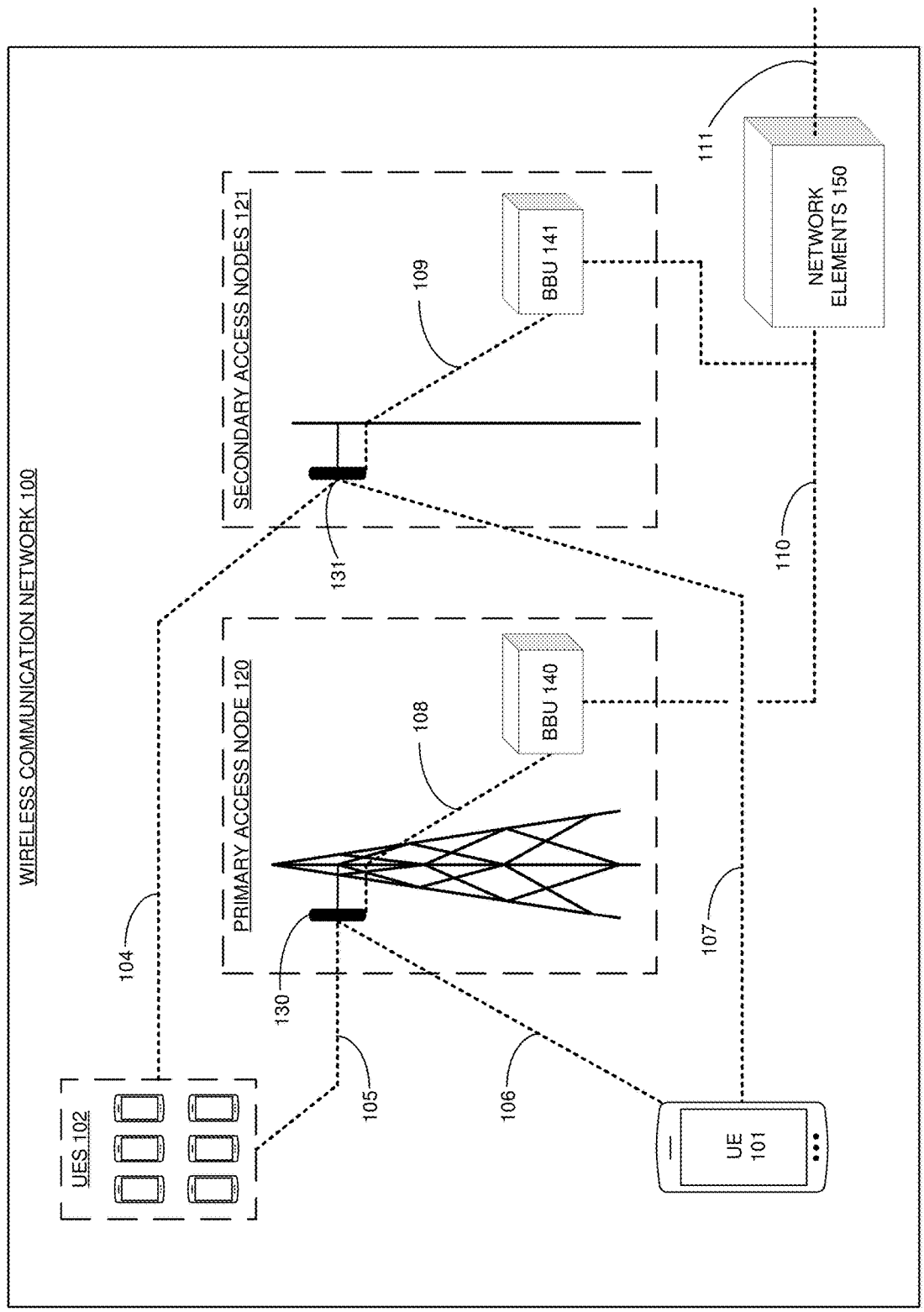
FIG. 1 illustrates a wireless communications network to serve a wireless User Equipment with a wireless communication service over multiple wireless links based on radio metric variance.

FIG. 1 illustrates wireless communication network 100 to serve wireless User Equipment (UE) 101 with a wireless communication service over multiple wireless links based on radio metric variance. Wireless communication network 100 comprises wireless UE 101, UEs 102, links 104-111, primary access node 120, secondary access nodes 121, and network elements 150. Primary access node 120 comprises radio 130 and Baseband Unit (BBU) 140. Secondary access nodes 121 comprises radio 131 and BBU 141. UEs 102 comprise UEs at different geographic locations.

BBU 140 determines variances in radio metrics for secondary access nodes 121. Radio metric variance is the average difference between received radio measurements and the average radio measurement for a radio metric over a period of time. For example, BBU 140 utilize a variance algorithm, data structure, or other computational method to determine radio metric variances for different radio metrics.

Various examples of network operation and configuration are described herein. In some examples, primary access node 120 serves wireless UEs 102 with the wireless communication service. UEs 102 measure a signal metric for secondary access nodes 121. UEs 102 transfer measurement reports characterizing the signal metric for secondary access nodes 121 to radio 130. Radio 130 receives the measurement reports indicating the signal metric and transfers the measurement reports to BBU 140. BBU 140 determines variances in the radio metric from the measurement reports and associates the radio metric variances with the different locations of UEs 102. Exemplary signal metrics comprise Received Signal Received Power (RSRP), Received Signal Received Quality (RSRQ), Received Signal Code Power (RSCP), Energy per Chip over Noise Spectral Density (Ec/No), Receiver Level (RxLev), or some other radio measurement.

UE 101 wirelessly attaches to radio 130. Radio 130 wirelessly exchanges user data with UE 101. Radio 130 exchanges the user data with BBU 140. BBU 140 exchanges the user data with network elements 150. Network elements 150 exchange the user data with external systems. UE 101 exchanges user signaling with radio 130 to attach to secondary access nodes 121. Radio 130 exchanges the user signaling with BBU 140. BBU 140 determines the location of UE 101 and the radio metric variance associated with the location of UE 101. BBU 140 determines a measurement time period for UE 101 based on the radio metric variance associated with the location of UE 101. The measurement time period is the length of time UE 101 measures the signal metric for secondary access nodes 121. BBU 140 transfers measurement instructions specifying the measurement time period to radio 130. Radio 130 wirelessly transfers the measurement instructions to UE 101.

UE 101 receives the measurement instructions and measures the signal metric for secondary access nodes 121 for the length of time specified by the measurement instructions. UE 101 wirelessly transfers a measurement report characterizing the signal metric for secondary access nodes 121 to radio 130. Radio 130 transfers the measurement report to BBU 140. BBU 140 determines to add secondary access nodes 121 based on the radio metric of the new measurement report. BBU 140 transfers network signaling to secondary access nodes 121 to serve UE 101 and transfers user signaling to radio 130. Radio 130 wirelessly transfers the user signaling to UE 101 to attach to secondary access nodes 121. UE 101 attaches to secondary access nodes 121. Secondary access nodes 121 wirelessly exchanges user data for the wireless communication service with UE 101. Secondary access nodes 121 exchanges the user data with network elements 150. Network elements 150 exchange the user data with external systems.

UEs 101-102, and radios 130-131 comprise antennas, amplifiers, filters, modulation, analog/digital interfaces, microprocessors, software, memories, transceivers, bus circuitry, and the like. Although UEs 101-102 are depicted as smartphones, UEs 101-102 might instead comprise computers, robots, vehicles, or other data appliances with wireless communication circuitry. Radios 130-132 are mounted on a tower, but radios 130-132 may use other mounting structures or no mounting structure at all.

BBUs 140-141, and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Access nodes 120-121 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, Long Term Evolution (LTE) eNodeBs, WIFI hotspots, Low-Power Wide Area Network (LP-WAN) nodes, and/or some other wireless network apparatus. Network elements 150 comprise User Plane Functions (UPFs), Access and Mobility Management Function (AMFs), System Architecture Evolution Gateways (SAE GWs), Mobility Management Entities (MMEs), and/or some other network apparatus.

Wireless links 104-107 use over-the-air air electromagnetic frequencies in the low-band, mid-band, high-band, or some other portion of the electromagnetic spectrum. Wireless links 104-107 use protocols like 5GNR, LTE, MMW, Institute of Electrical and Electronic Engineers (IEEE) 802.11 (WIFI), LP-WAN, and/or some other format of wireless protocol. Links 108-111 use metal, glass, air, or some other media. Links 108-111 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 104-111 may comprise intermediate network elements like relays, routers, and controllers.

Figure 2:
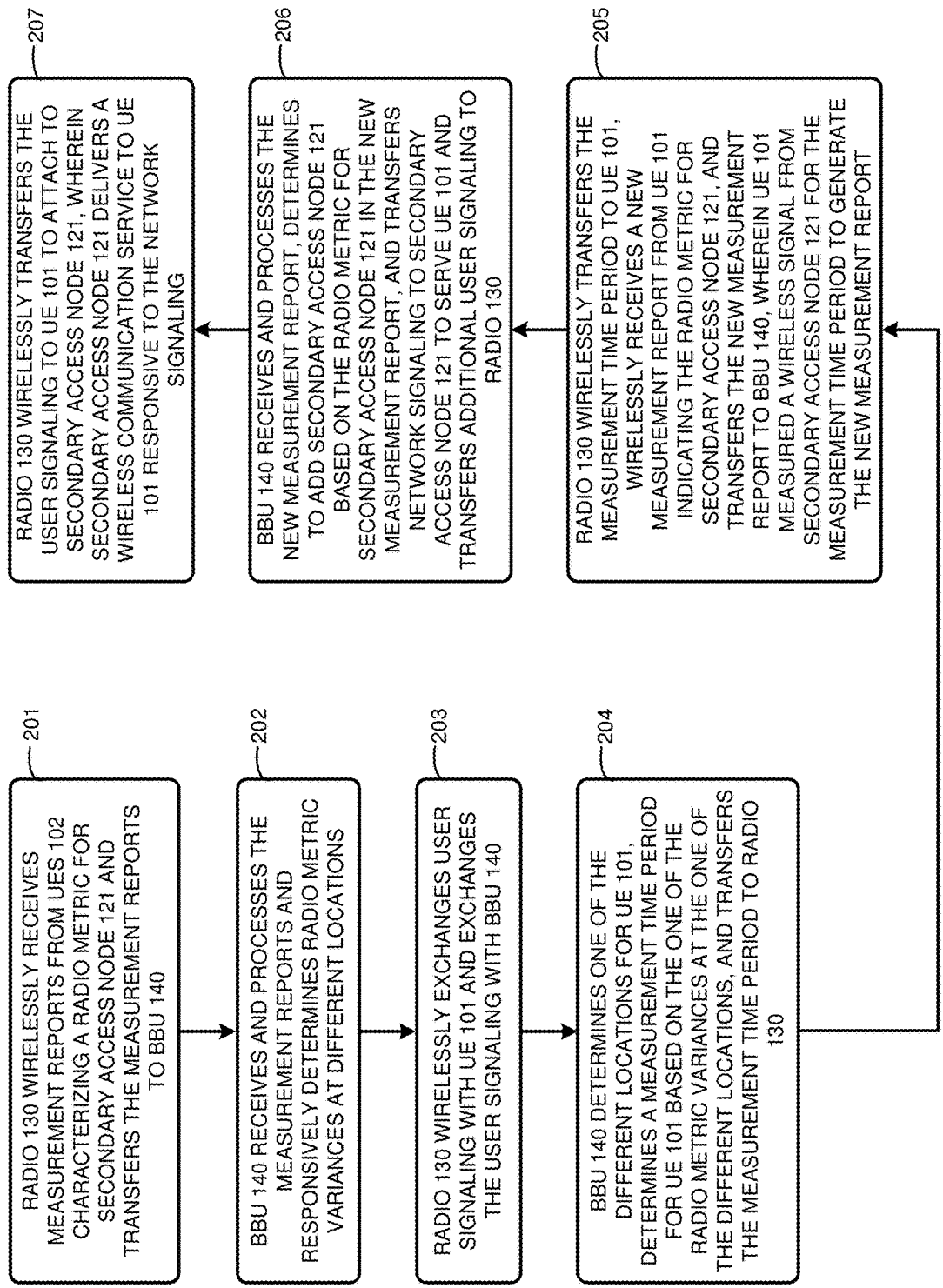
FIG. 2 illustrates an exemplary operation of the wireless communication network to serve the wireless UE over multiple wireless links based on the radio metric variance.

FIG. 2 illustrates an exemplary operation of wireless communication network 100 to serve wireless UE 101 with a wireless communication service over multiple wireless links based on radio metric variance. Radio 130 wirelessly receives measurement reports from UEs 102 characterizing a radio metric for secondary access nodes 121 and transfers the measurement reports to BBU 140 (201). BBU 140 receives and processes the measurement reports and responsively determines radio metric variances at different locations (202). Radio 130 wirelessly exchanges user signaling with UE 101 and exchanges the user signaling with the BBU 140 (203). BBU 140 determines one of the different locations for the UE 101, determines a measurement time period for the UE 101 based on the one of the radio metric variances at the one of the different locations, and transfers the measurement time period to radio 130 (204). For example, BBU 140 may select a high measurement time period for UE 101 when the radio metric variance for the location of UE 101 is high. Conversely, BBU 140 may select a low measurement time period for UE 101 when the radio metric variance for the location of UE 101 is low.

Radio 130 wirelessly transfers the measurement time period to UE 101, wirelessly receives a new measurement report from UE 101 indicating the radio metric for secondary access nodes 121 and transfers the new measurement report to the BBU 140. In this example, UE 101 measured a wireless signal from secondary access nodes 121 for the measurement time period to generate the new measurement report (205). BBU 140 receives and processes the new measurement report, determines to add secondary access nodes 121 based on the radio metric for secondary access nodes 121 in the new measurement report, and transfers network signaling to secondary access nodes 121 to serve the UE and transfers additional user signaling to radio 130 (206). Radio 130 wirelessly transfers the user signaling UE 101 to attach to the secondary access node and the secondary access node delivers the wireless communication service to the new UE responsive to the network signaling (207).

Figure 3:
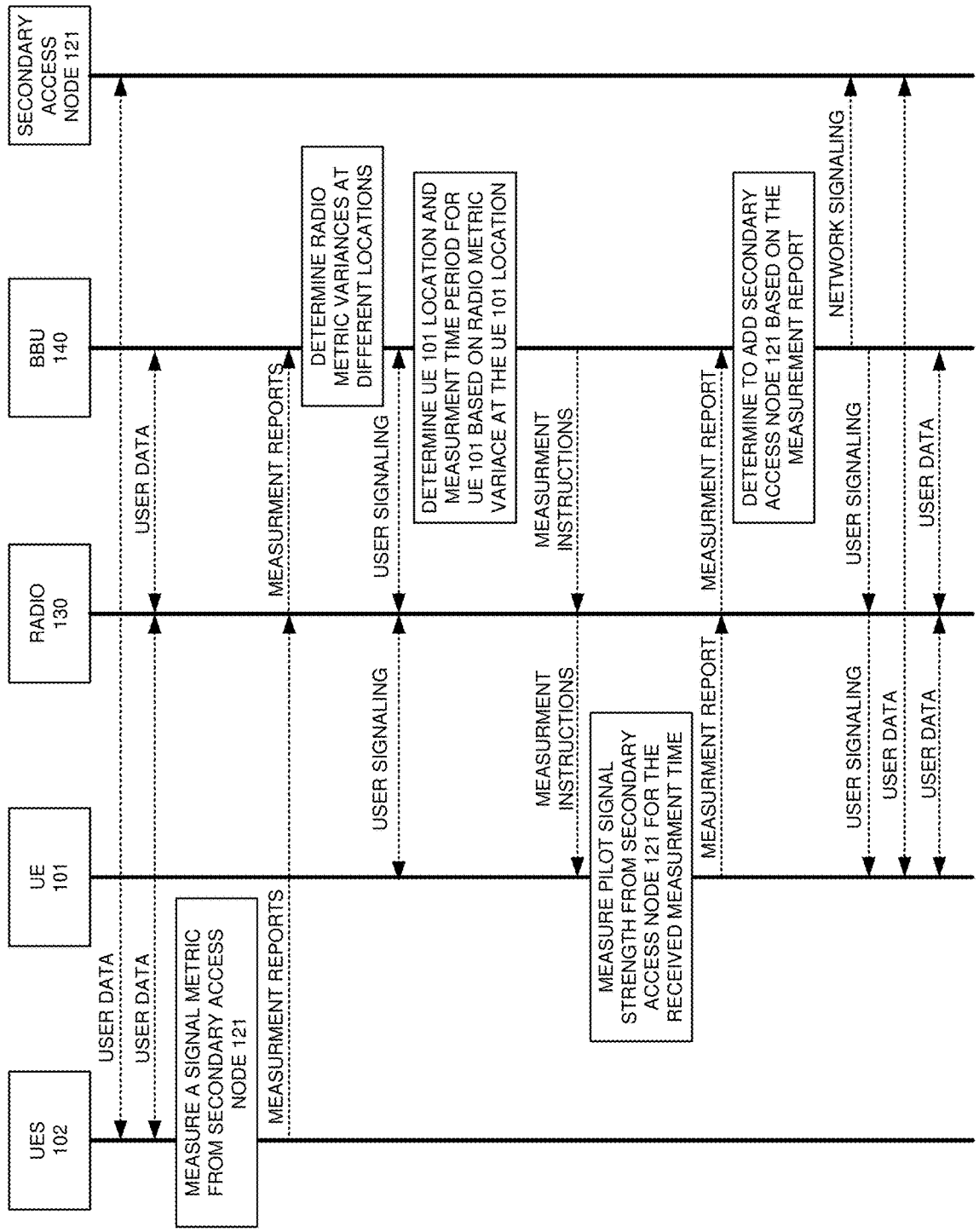
FIG. 3 illustrates an exemplary operation of the wireless communication network to serve the wireless UE over multiple wireless links based on the radio metric variance.

FIG. 3 illustrates an exemplary operation of wireless communication network 100 to serve UE 101 over multiple wireless links based on radio metric variance. In this example, radio metric variance of a location is used to determine measurement time periods for adding a secondary access node. UEs 102 exchange user data with BBU 140 over radio 130 and with secondary access nodes 121. UEs 102 measure a signal metric for secondary access nodes 121. UEs 102 wirelessly transfer measurement reports to radio 130 characterizing the signal metric for secondary access nodes 121. Radio 130 transfers the measurement reports to BBU 140. BBU 140 determines radio metric variances at different locations based on the signal metric for secondary access nodes 121.

UE 101 wirelessly exchanges user signaling with radio 130 which exchanges the user signaling with BBU 140. BBU 140 determines the location of UE 101 and a measurement time period for UE 101 based on the radio metric variance at the location of UE 101. BBU 140 may implement a data structure to determine the measurement time period for UE 101 and may update the data structure to reflect changes in determined radio metric variance. BBU 140 transfers measurement instructions specifying the length of time UE 101 measures the signal metric for secondary access nodes 121. Radio 130 wirelessly transfers the measurement instructions to UE 101. UE 101 receives the measurement instructions from radio 130 and measures the signal metric for secondary access nodes 121 for the length of time specified by the measurement instructions. UE 101 wirelessly transfers a measurement report to radio 130 that characterizes the signal metric for secondary access nodes 121. Radio 130 transfers the measurement report to BBU 140.

BBU 140 determines to add secondary access nodes 121 based on the signal metric of the measurement report received from UE 101. For example, BBU 140 may determine to add secondary access nodes 121 when the radio metric for secondary access nodes 121 exceeds an addition threshold for secondary access nodes 121. BBU 140 transfers network signaling to secondary access nodes 121 to serve UE 101. BBU 140 transfers user signaling to radio 130. Radio 130 transfers the user signaling to UE 101 to attach to secondary access nodes 121. UE 101 exchanges user data for the wireless communication service with BBU 140 over radio 130 and with secondary access nodes 121.

Figure 4:
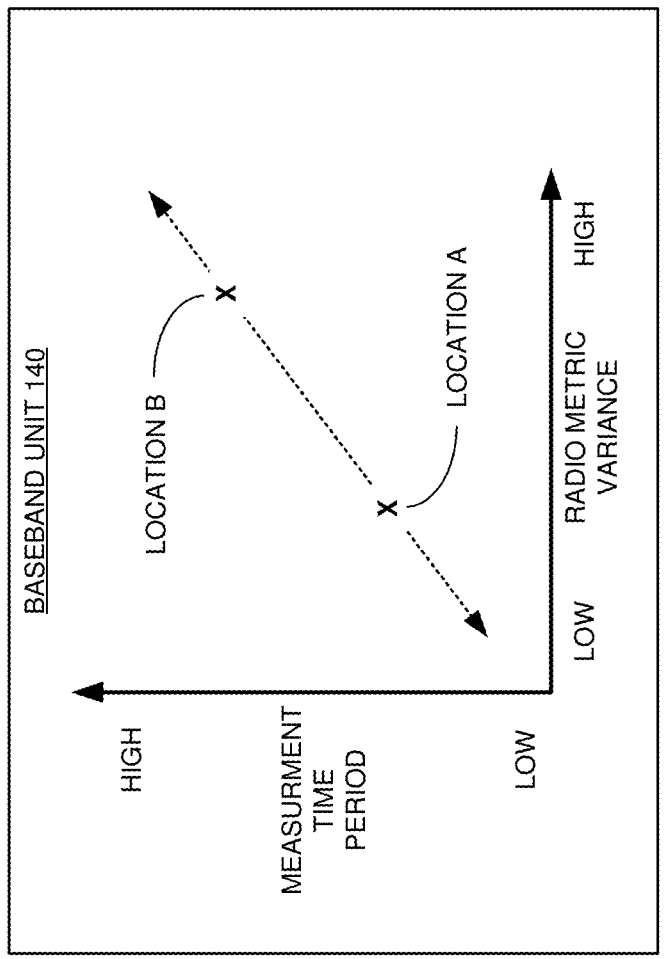
FIG. 4 illustrates a Baseband Unit (BBU) to implement a data structure that correlates the radio metric variance to a measurement time period.

FIG. 4 illustrates an exemplary operation of BBU 140 to serve UEs over multiple wireless links based on radio metric variance. BBU 140 hosts a data structure that implements the graph shown on FIG. 4. The vertical axis of the graph indicates a measurement time period in an exemplary range: Low to High. The horizontal axis indicates a radio metric variance in an exemplary range: Low to High. These terms are illustrative and numerical values could be used. As indicated by the X marks on the graph, a radio metric variance correlates to a measurement time period. BBU 140 associates individual radio metric variances with different locations. As shown in FIG. 4, a radio metric variance associated with Location A corresponds to a measurement time period for Location A. Another radio metric variance associated with Location B corresponds to measurement time period for Location B. In other examples, BBU 140 may associate radio metric variances with location and frequency band to determine measurement time periods. In other examples, BBU 140 may associate radio metric variance with a specific type of radio metric to determine measurement time period. BBU 140 determines the location of a UE and selects a measurement time period for the UE based on the radio metric variance associated with the location, frequency band, and/or radio metric of the UE.

Advantageously, BBU 140 effectively and efficiently controls the measurement time period to mitigate inaccurate radio measurements due to radio metric variance.

Figure 5:
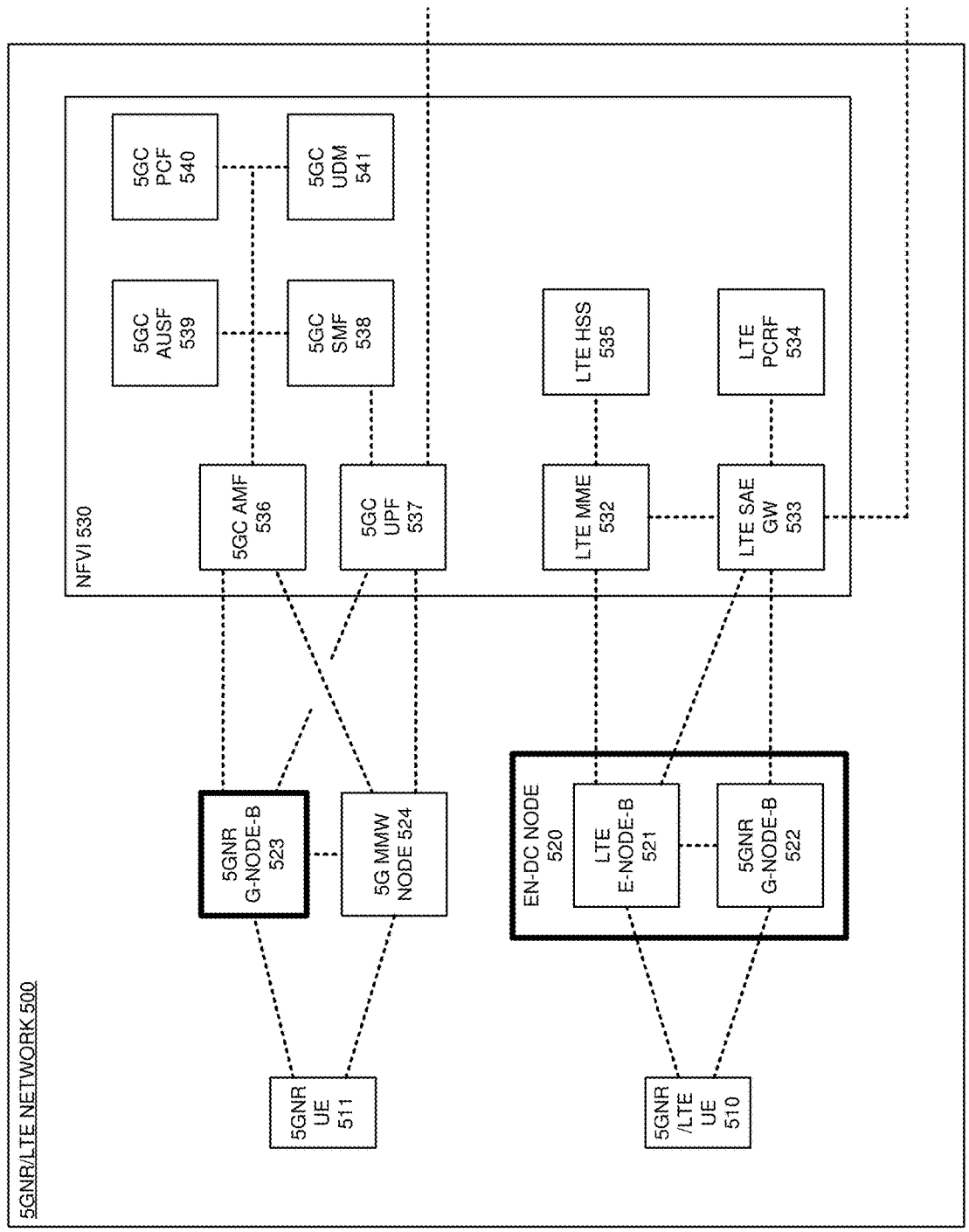
FIG. 5 illustrates a Fifth Generation New Radio (5GNR) Long Term Evolution (LTE) network to serve UEs over multiple wireless links based on radio metric variance.

FIG. 5 illustrates Fifth Generation New Radio (5GNR) Long Term Evolution (LTE) network 500 to serve UEs 510-511 based on radio metric variance. 5GNR/LTE network 500 is an example of wireless communication network 100, although network 100 may differ. 5GNR/LTE network 500 comprises 5GNR/LTE UE 510, 5GNR UE 511, EN-DC node 520, 5GNR gNodeB 523, 5G MMW node 524, and Network Function Virtualization Infrastructure (NFVI) 530. EN-DC node 520 comprises LTE eNodeB 521 and 5GNR gNodeB 522. NFVI 530 comprises LTE Mobility Management Entity (MME) 532, LTE System Architecture Evolution Gateway (SAE GW) 533 LTE, LTE Policy Charging Rules Function (PCRF) 534, LTE Home Subscriber System (HSS) 535, Fifth Generation Core (5GC) Access and Mobility Management Function (AMF) 536, 5GC User Plane Function (UPF) 537, 5GC Session Management Function (SMF) 538, 5GC Authentication and Security Function (AUSF) 539, Policy Control Function (PCF 540), and 5GC Unified Data Manager (UDM) 541. In some examples, SAE GW 533 may be divided into a Serving Gateway (SGW) and a Packet Data Network Gateway (PGW).

In operation, LTE eNodeB 521 receives B1 measurement reports from UEs indicating signal strength for 5GNR gNodeB 522 at different locations. LTE eNodeB 521 determines variances in the signal strength measurements for the different locations. LTE eNodeB 521 determines geographic regions and an average signal strength variance for each of the different geographic regions based on the variances in the signal strength measurements for the different locations. In some examples, LTE eNodeB 521 may host a data structure to identify the different geographic regions. UE 510 attaches to LTE eNodeB 521 in EN-DC node 520 and UE 510 indicates its 5G capabilities and its location. LTE eNodeB 521 requests data service for UE 510 from LTE MME 532 over S1-MME signaling and indicates the 5G capabilities of UE 510. LTE MME 532 interacts with HSS 535 to authenticate and authorize LTE/5GNR UE 510 for wireless data services that are represented by Access Point Names (APNs). LTE MME 532 generates a B1 measurement object for 5GNR/LTE UE 510 in response to the 5G UE capabilities and the UE authorization. The B1 measurement object may include frequencies for UE 510 to measure when establishing duel connectivity. LTE MME 532 transfers the APNs for UE 510 to SAE GW 533. SAE GW 533 interacts with LTE PCRF 534 to select Quality-of-Service Class Identifiers (QCIs) and network addresses for UE 510 based on the APNs. SAE GW 533 transfers the APNs, QCIs, and network addresses for UE 510 to LTE MME 532. MME 532 transfers the APNs, QCIs, network address, and the B1 measurement object for UE 510 to LTE eNodeB 521. LTE SAE GW 533 exchanges user data for UE 510 with external systems. SAE GW 533 exchanges the user data with LTE eNodeB 521. LTE eNodeB 521 exchanges the user data with UE 510.

LTE eNodeB 521 determines a geographic region for UE 510 based on the location of UE 510. In some examples, UE 510 may not report its location to LTE eNodeB 521 and LTE eNodeB 521 may instead use triangulation or other techniques to determine the location of UE 510. LTE eNodeB 521 determines a Time-To-Trigger (TTT) for UE 510 based on the signal strength variance associated with the geographic region of UE 510. The TTT indicates the length of time UE 510 measures the signal strength of the reference signal for 5GNR gNodeB 522. The typical time to trigger is around a few milliseconds in length. Typically, LTE eNodeB 521 increases the TTT by a few milliseconds from the average TTT when the signal strength variance for the geographic region of UE 510 is high. Conversely, LTE eNodeB 521 decreases the TTT by a few milliseconds from the average TTT when the signal strength variance for the geographic region of UE 510 is low. In some examples, a large radio metric variance may be a variance of 5 dB within 10 milliseconds. LTE eNodeB 521 specifies the TTT in the B1 measurement object and transfers the selected APNs, QCIs, network addresses, and B1 measurement object to UE 510.

In response to the B1 measurement object, UE 510 measures the signal strength of the reference signal from 5GNR gNodeB 522 for the amount of time specified by the TTT. UE 510 transfers the signal strength measurement to LTE eNodeB 521. LTE eNodeB 521 determines frequency offset and hysteresis for 5GNR gNodeB 522. LTE eNodeB 521 determines a B1 addition threshold for 5GNR gNodeB 522. LTE eNodeB 521 determines an inter Radio Access Technology (RAT) addition value for 5GNR gNodeB 522. The inter-RAT addition value comprises a sum of the signal strength, the frequency offset, and the hysteresis. LTE eNodeB 521 determines when the inter-RAT addition value for 5GNR gNodeB 522 is greater than the B1 addition threshold for 5GNR gNodeB 522. When the inter-RAT addition value is greater than the B1 addition threshold for 5GNR gNodeB 522, LTE eNodeB 521 directs 5GNR gNodeB 522 to serve UE 510 and directs UE 510 to attach to 5GNR gNodeB 522. LTE eNodeB 521 notifies LTE MME 532 and LTE MME 532 directs SAE GW 533 to serve UE 510 over 5GNR gNodeB 522. In response, LTE SAE GW 533 exchanges user data for UE 510 with 5GNR gNodeB 522. 5GNR gNodeB 522 exchanges the user data with UE 510.

LTE eNodeB 521 determines a B1 drop threshold for 5GNR gNodeB 522. The B1 drop threshold may comprise a different threshold value than the B1 addition thresholds. LTE eNodeB 521 receives a subsequent 5GNR signal strength measurement for 5GNR gNodeB 522 from UE 510. LTE eNodeB 521 determines an inter-RAT drop value for 5GNR gNodeB 522 based on the sum of the subsequent signal strength, the frequency offset, and the hysteresis. When the inter-RAT drop value for 5GNR gNodeB 522 is lower than the B1 drop threshold for 5GNR gNodeB 522, LTE eNodeB 521 signals 5GNR gNodeB 522 to stop serving UE 510 and signals UE 510 to detach from 5GNR gNodeB 522. LTE MME 532 directs LTE SAE GW 533 to stop serving UE 510 over 5GNR gNodeB 522. In response, LTE SAE GW 533 stops exchanging the user data for UE 510 with 5GNR gNodeB 522. 5GNR gNodeB 522 stops exchanging the user data with UE 510.

Note that 5GNR gNodeB 523 and 5G MMW node 524 use different types of 5G Radio Access Technology (RAT). The different types of 5G RAT may have different frequency channel sizes, frequency levels, resource block time intervals, and resource block bandwidths. For example, 5GNR gNodeB 523 may provide an enhanced voice calling service with unique time intervals and bandwidths while MMW node 524 may provide an enhanced video broadcast service with unique time intervals and bandwidths while. Some 5G UEs are not capable of using each type of 5G RAT from 5GNR gNodeB 523 and 5G MMW node 524, but 5GNR UE 511 is capable of using each type of 5G RAT.

In operation, 5GNR gNodeB 523 receives 5GNR inter-RAT measurement reports from UEs indicating signal strength for MMW gNodeB 524 at different locations. 5GNR gNodeB 523 determines variances in the signal strength measurements for the different locations. 5GNR gNodeB 523 determines geographic regions and an average signal strength variance for each of the different geographic regions based on the variances in the signal strength measurements for the different locations. For example, 5GNR gNodeB 523 may implement a cluster algorithm to generate a heat map of radio metric variance. 5GNR gNodeB 523 may group radio metric variance by geo-bins or other mapping techniques. 5GNR UE 511 attaches to 5GNR gNodeB 523 and indicates its 5G capabilities for the multiple types of 5G RAT and its location. 5GNR gNodeB 523 requests data service for UE 511 from 5GC AMF 536 over N2 signaling the indicates the 5G capabilities for UE 511. 5GC AMF 536 interacts with 5GC SMF 538, 5GC AUSF 539, 5GC UDM 541, and 5GC PCF 540 to authenticate and authorize 5GNR UE 511 for 5G data services. 5GC AMF 536 generates a 5GNR measurement object in response to the 5G UE capabilities and the 5G authorization. The 5GNR measurement object may specify frequency bands for UE 511 to measure when establishing duel connectivity. 5GC AMF 536 transfers quality-of-service metrics, network addressing, and 5GNR measurement object for UE 511 to 5GNR gNodeB 523 and 5GC SMF 538. 5GC SMF 538 directs 5GC UPF 537 to serve UE 511 per the quality-of-service metrics and network addressing over 5GNR gNodeB 523.

5GNR gNodeB 523 determines a geographic region for UE 511 based on the location of UE 511. In some examples, UE 511 may not report its location to 5GNR gNodeB 523 and 5GNR gNodeB 523 may instead use triangulation or other techniques to determine the location of UE 511. 5GNR gNodeB 523 determines a TTT based on the signal strength variance associated with the geographic region of UE 511. The TTT indicates the length of time UE 511 measures the reference signal for 5G MMW access node 524. Typically, 5GNR gNodeB 523 selects a longer TTT when the signal strength variance for the geographic region of UE 511 is high. Conversely, 5GNR gNodeB 523 selects a shorter TTT when the signal strength variance for the geographic region of UE 511 is low. 5GNR gNodeB 523 specifies the TTT in the 5GNR measurement object and transfers the selected APNs, QCIs, network addresses, and 5GNR measurement object to UE 511.

In response to the 5GNR measurement object, UE 511 measures the signal strength of the reference signal from 5G MMW node 524 for the amount of time specified by the TTT and wirelessly transfers the signal strength to 5GNR gNodeB 523. 5GNR gNodeB 523 determines the frequency offset, and hysteresis for 5G MMW node 524. 5GNR gNodeB 523 determines an inter-RAT addition threshold for 5G MMW node 524. 5GNR gNodeB 523 determines an inter-RAT addition value for 5G MMW node 524 based on the signal strength for 5G MMW node 524, the frequency offset, and the hysteresis.

5GNR gNodeB 523 determines when the inter-RAT addition value for 5G MMW node 524 is greater than the inter-RAT addition threshold for 5G MMW node 524. When the inter-RAT addition value is greater than the inter-RAT addition threshold for 5G MMW node 524, 5GNR gNodeB 523 directs 5G MMW node 524 to serve UE 511 and directs UE 511 to attach to 5G MMW node 524. 5GNR gNodeB 523 notifies 5GC AMF 536 of the attachments. 5GC AMF 536 directs 5GC SMF 538 to direct 5GC UPF 537 to serve UE 511 per the quality-of-service metrics and network addressing over 5G MMW node 524. 5GNR UE 511 attaches to 5G MMW node 524 and 5G MMW node 524 exchanges user data with UE 511.

5GNR gNodeB 523 also determines an inter-RAT drop threshold for 5G MMW node 524. 5GNR gNodeB 523 receives subsequent signal strength measurements for 5G MMW node 524 from UE 511. 5GNR gNodeB 523 determines an inter-RAT drop value for 5G MMW node 524 based on the subsequent signal strength for 5G MMW node 524, the frequency offset, and the hysteresis. When the drop value for MMW node 524 is lower than the drop threshold for MMW node 524, 5GNR gNodeB 523 signals UE 511 to detach from 5G MMW node 524 and 5G MMW node 524 stops exchanging the user data with UE 511.

Advantageously, LTE eNodeB 521 effectively and efficiently manipulates TTT to mitigate the effects of radio metric variance when adding 5GNR gNodeB 522. Likewise, 5GNR gNodeB 523 effectively and efficiently manipulates TTT to mitigate the effects of radio metric variance when adding 5G MMW node 524.

In some examples, UEs 510-511 determine radio metric variance at their respective locations and report the determined radio metric variance to EN-DC node 520 and to 5GNR gNodeB 523. UEs 510-511 may take multiple signal strength measurements to determine radio metric variance at their locations and transfer radio metric variance reports to LTE eNodeB 521 and 5GNR gNodeB 523 that indicate the measured radio metric variance at the locations of UEs 510-511.

Figure 6:
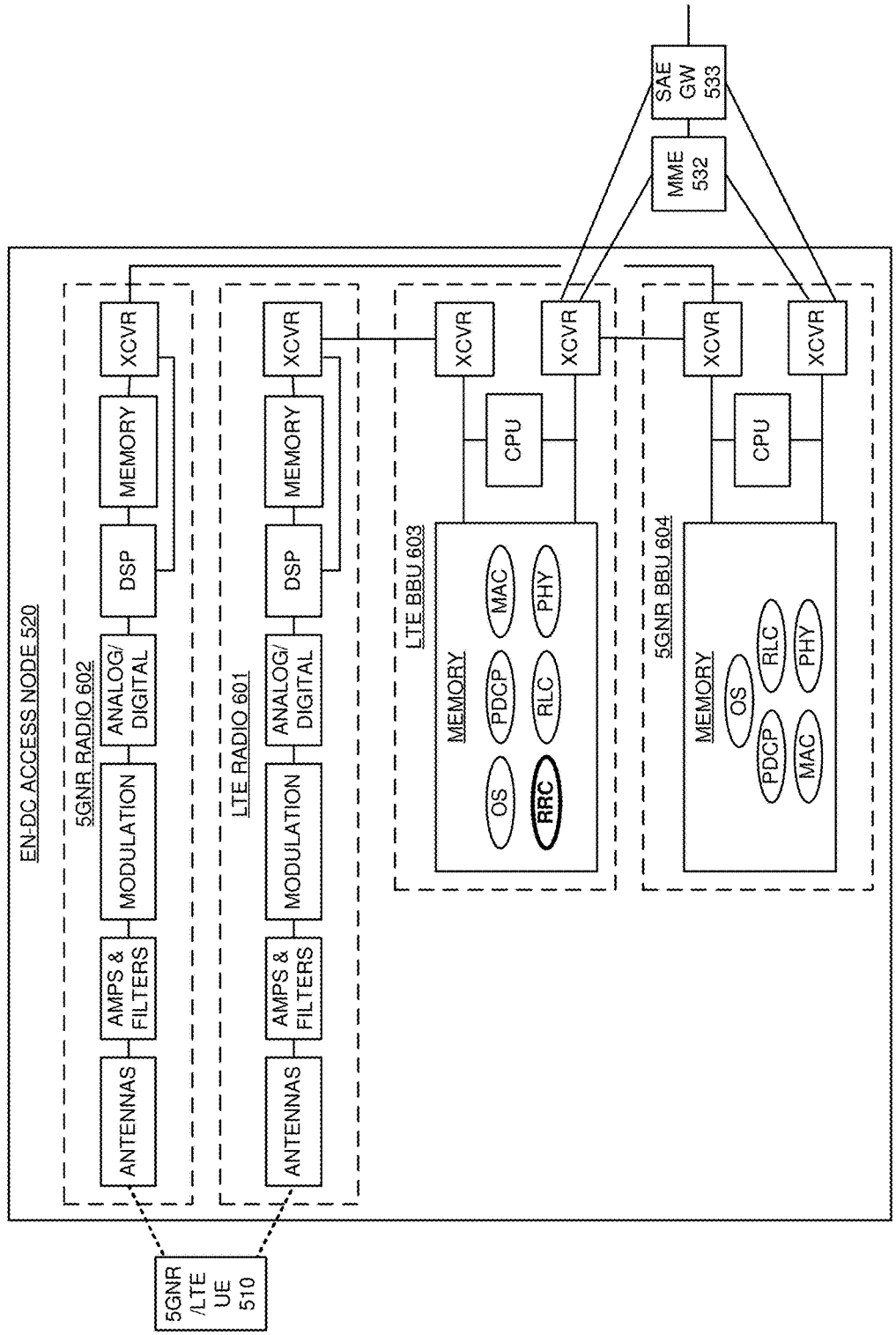
FIG. 6 illustrates an Evolved Universal Terrestrial Radio Access Network Dual Connectivity (EN-DC) access node to serve UEs over multiple wireless links based on radio metric variance.

FIG. 6 illustrates EN-DC access node 520 to serve UE 510 over 5GNR based on radio metric variance. EN-DC access node 520 is an example of primary access node 120, although primary access node 120 may differ. As shown in FIG. 5, EN-DC access node 520 includes LTE eNodeB 521 and 5GNR gNodeB 522, however LTE eNodeB 521 and 5GNR gNodeB 522 are omitted for clarity. EN-DC access node 520 comprises LTE radio 601, 5GNR radio 602, LTE Baseband Unit (BBU) 603, and 5GNR BBU 604. Radios 601-602 comprise antennas, amplifiers, filters, modulation, analog-to-digital interfaces, DSP, memory, and transceivers (XCVR) that are coupled over bus circuitry. BBUs 603-604 comprise memory, CPU, and transceivers that are coupled over bus circuitry. The memories in BBUs 603-604 store operating systems (OS) and network applications like Physical Layer (PHY), Media Access Control (MAC), Radio Link Control (RLC), Packet Data Convergence Protocol (PDCP), and Radio Resource Control (RRC). The CPUs in BBUs 603-604 execute the operating systems, PHYs, MACs, RLCs, PDCPs, and RRCs to exchange network signaling between UE 510 and MME 532 and to exchange user data between UE 510 and SAE GW 533.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 510 is wirelessly coupled to the antennas in LTE radio 601 over an LTE link. The transceiver in LTE radio 601 is coupled to a transceiver in LTE BBU 603 over Common Public Radio Interface (CPRI) links. A transceiver in LTE BBU 603 is coupled to MME 532 and SAE GW 533 over backhaul links. UE 510 is wirelessly coupled to the antennas in 5GNR radio 602 over an 5GNR link. The transceiver in 5GNR radio 602 is coupled to a transceiver in 5GNR BBU 604 over CPRI links. A transceiver in 5GNR BBU 604 is coupled to MME 532 and to SAE GW 533 over backhaul links. A transceiver in LTE BBU 603 is coupled to transceivers in 5GNR BBU 604 over X2 links.

In operation, the antennas in LTE radio 601 receives B1 measurement reports indicating signal strength for 5GNR BBU 604 at different locations. LTE radio 601 transfers the B1 measurement reports to the LTE RRC in LTE BBU 603 over the CPRI links. The LTE RRC in LTE BBU 603 determines variances in the signal strength measurements for the different locations. The LTE RRC in LTE BBU 603 determines geographic regions and an average signal strength variance for each of the different geographic regions based on the variances in the signal strength measurements for the different locations.

UE 510 wirelessly attaches to LTE antennas in LTE radio 601. The LTE antennas in LTE radio 601 receive wireless LTE signals from UE 510 that transport Uplink (UL) LTE signaling, UL LTE data. The UL signaling indicates 5GNR capabilities for UE 510 and the location of UE 510. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capabilities of UE 510, to MME 532 over the backhaul links. MME 532 authenticates and authorizes 5GNR service for UE 510. In response to the authorization, MME 532 generates a B1 measurement object for UE 510. The LTE PDCP transfers the UL LTE data to LTE SAE GW 533 over the backhaul links.

In LTE BBU 603, the LTE RRC receives the DL S1-MME signaling including the B1 measurement object from MME 532. The PDCP receives DL LTE data from SAE GW 533. The LTE RRC in LTE BBU 603 determines a geographic region for UE 510 based on the location of UE 510. LTE RRC in LTE BBU 603 determines a Time-To-Trigger (TTT) based on the signal strength variance associated with the geographic region of UE 510. The TTT indicates the length of time UE 510 measures the reference signal for 5GNR BBU 604. Typically, LTE RRC in LTE BBU 603 selects a longer TTT when the signal strength variance for the geographic region of UE 510 is high. Conversely, LTE eNodeB 521 selects a shorter TTT when the signal strength variance for the geographic region of UE 510 is low. The LTE RRC in BBU 603 specifies the TTT in the B1 measurement object.

The LTE network applications process the new DL LTE signaling and the DL LTE data to generate corresponding DL LTE symbols that carry the DL LTE signaling, DL LTE data, and the B1 measurement object. In LTE radio 601, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and B1 measurement object to UE 510.

In response to the B1 measurement object, UE 510 measures signal strength for 5GNR BBU 604 for the amount of time specified by the TTT. UE 510 wirelessly transfers the 5GNR signal strength to LTE radio 601. LTE radio 601 exchanges the 5GNR signal strength with LTE BBU 603 over the CPRI link. The LTE RRC in LTE BBU 603 determines frequency offset and hysteresis for 5GNR BBU 604. The LTE RRC in LTE BBU 603 determines a B1 add threshold for 5GNR BBU 604. The LTE RRC in BBU 603 determines an inter-RAT add value for 5GNR BBU 604 based on the sum of the signal strength, the frequency offset, and the hysteresis for 5GNR BBU 604. The LTE RRC in BBU 603 determines when the inter-RAT add value is greater than the B1 add threshold. When the inter-RAT add value for 5GNR BBU 604 exceeds the B1 add threshold for 5GNR BBU 604, the LTE RRC in BBU 603 directs the 5GNR PDCP in 5GNR BBU 604 to serve UE 510. The LTE RRC in BBU 603 also directs UE 510 to attach to the 5GNR PDCP in 5GNR BBU 604.

UE 510 attaches to the 5GNR PDCP in BBU 604 over 5GNR radio 602. The LTE RRC in BBU 603 notifies MME 532 of the 5GNR attachment. MME 532 directs SAE GW 533 to serve UE 510 over 5GNR BBU 604. SAE GW 533 exchanges 5GNR data with the 5GNR PDCP in 5GNR BBU 604. The 5GNR PDCP in BBU 604 exchanges the 5GNR data with the 5GNR PDCP in UE 510 over the RLCs, MACs, and PHYs.

In 5GNR radio 602, the antennas receive wireless 5GNR signals from UE 510 that transport Uplink (UL) 5GNR signaling and UL 5GNR data. The antennas in 5GNR radio 602 transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 603 to generate new UL X2 signaling and new DL 5GNR signaling. The 5GNR PDCP transfers the new UL X2 signaling to the LTE RRC in BBU 603. The 5GNR PDCP transfers the UL 5GNR data to SAE GW 533 over backhaul links.

In 5GNR BBU 604, the 5GNR PDCP receives the DL X2 signaling from the LTE RRC in BBU 603. The 5GNR PDCP also receives DL 5GNR data from SAE GW 533. The 5GNR network applications process the new DL 5GNR signaling and the DL 5GNR data to generate corresponding DL 5GNR symbols that carry the DL 5GNR signaling and DL 5GNR data. In 5GNR radio 602, the DSPs process the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas in 5GNR radio 602 to emit corresponding wireless 5GNR signals that transport the DL 5GNR signaling and DL 5GNR data to UE 510.

In this example, the LTE RRC in LTE BBU 603 also determines a B1 drop threshold for 5GNR BBU 604. The LTE RRC in BBU 603 wirelessly receives a subsequent 5GNR signal strength measurement for 5GNR BBU 604 from UE 510. The LTE RRC in LTE BBU 603 determines inter-RAT drop values for 5GNR BBU 604 based on the subsequent signal strengths, the frequency offsets, and the hysteresis. The LTE RRC in LTE BBU 603 stops the service to UE 510 over 5GNR radio 602 when the inter-RAT drop value for 5GNR BBU 604 is less than the B1 drop threshold for 5GNR BBU 604. When the inter-RAT drop value for 5GNR BBU 604 is less than the B1 drop threshold, the LTE RRC in LTE BBU 603 directs the 5GNR PDCP in BBU 604 to stop serving UE 510 and notifies MME 532. The LTE RRC in LTE BBU 603 directs UE 510 to detach from 5GNR PDCP in 5GNR BBU 604. UE 510 wirelessly detaches from 5GNR BBU 604. MME 532 directs SAE GW 533 to stop serving UE 510 over the detached BBUs. SAE GW 533 stops exchanging 5GNR data with the 5GNR PDCP in 5GNR BBU 604. The 5GNR PDCP in BBU 604 stops exchanging the 5GNR data with the 5GNR PDCP in UE 510 over the RLCs, MACs, and PHYs.

Figure 7:
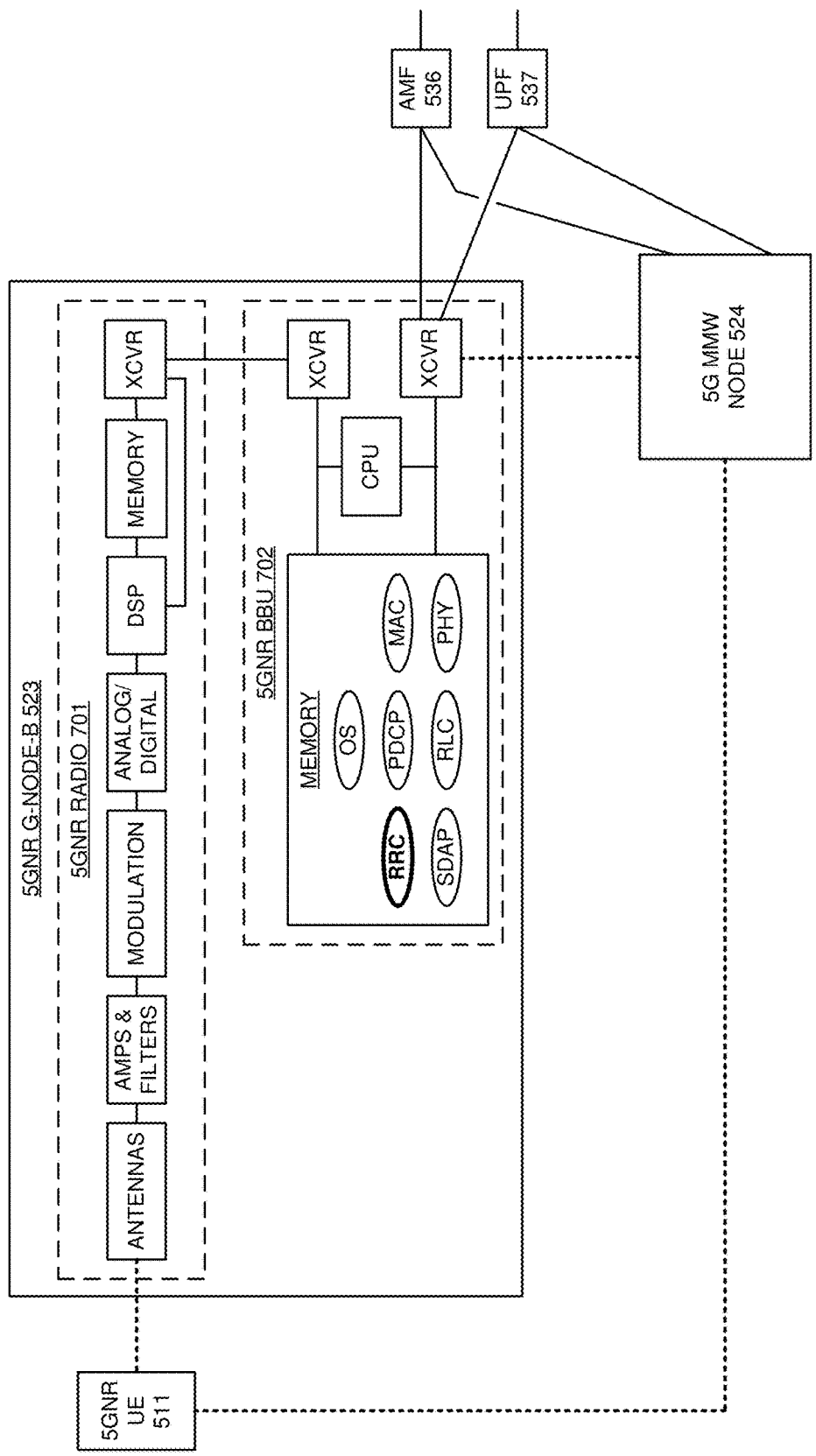
FIG. 7 illustrates a 5GNR gNodeB to serve UEs over multiple wireless links based on radio metric variance.

FIG. 7 illustrates 5GNR gNodeB 523 to serve over multiple wireless links based on radio metric variance. 5GNR gNodeB 523 is an example of primary access node 120, although access node 120 may differ. 5GNR gNodeB 523 comprises 5GNR radio 701 and 5GNR BBU 702. 5GNR radio 701 comprises antennas, amplifiers, filters, modulation, analog-to-digital interfaces, DSP, memory, and transceivers that are coupled over bus circuitry. 5GNR UE 511 is wirelessly coupled to the antennas in 5GNR radio 701 over a 5GNR link. The transceiver in 5GNR radio 701 is coupled to a transceiver in 5GNR BBU 702 over CPRI links. A transceiver in 5GNR BBU 702 is coupled to AMF 536 and UPF 537 over backhaul links. 5GNR BBU 702 comprises memory, CPU, and transceivers that are coupled over bus circuitry. The memory in BBU 702 stores operating systems and network applications like PHY, MAC, RLC, PDCP, RRC, and Service Data Adaptation Protocol (SDAP). The CPU in BBU 702 executes the operating systems, PHYs, MACs, RLCs, PDCPs, SDAPs, and RRCs to exchange network signaling with 5GNR UE 511 and AMF 536 and to exchange user data between 5GNR UE 511 and UPF 537.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, the antennas in 5GNR radio 701 receive 5GNR inter-RAT measurement reports indicating signal strength for MMW gNodeB 524 at different locations. 5GNR radio 702 transfers the inter-RAT measurement reports to the 5GNR RRC in 5GNR BBU 702 over CPRI links. The 5GNR RRC in 5GNR BBU 702 determines variances in the signal strength measurements for the different locations. The 5GNR RRC in 5GNR BBU 702 determines geographic regions and an average signal strength variance for each of the different geographic regions based on the variances in the signal strength measurements for the different locations. In some examples, the different geographic regions comprise different geographic volumes.

5GNR UE 511 wirelessly attaches to 5GNR radio 701. In 5GNR radio 701, the antennas receive wireless 5GNR signals from 5GNR UE 511 that transport UL 5GNR signaling and UL 5GNR data. The 5G UL signaling from UE 511 indicates 5G capabilities and location for UE 511. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5G RRC in 5GNR BBU 702 processes the UL 5GNR signaling and DL N2 signaling from AMF 536 to generate new UL N2 signaling and new DL 5GNR signaling. The 5GNR RRC transfers the new UL N2 signaling to AMF 536. The 5GNR SDAP in 5GNR BBU 702 transfers the UL 5GNR data to UPF 537 over backhaul links.

5GC AMF 536 interacts with 5GC SMF 538, 5GC AUSF 539, 5GC UDM 541, and 5GC PCF 540 to authenticate and authorize 5GNR UE 511 for 5G MMW services. 5GC AMF 536 generates a 5GNR measurement object for 5GNR UE 511 responsive to the 5G UE capabilities and the authorization. 5GC AMF 536 transfers quality-of-service metrics, network addressing, and 5GNR measurement object for UE 511 to the 5GNR RRC in BBU 602 and 5GC SMF 538. 5GC SMF 538 directs 5GC UPF 537 to serve UE 511 per the quality-of-service metrics and network addressing over 5GNR gNodeB 523.

In 5GNR BBU 702, the 5GNR RRC receives the DL N2 signaling from AMF 536. The 5GNR SDAP receives DL 5GNR data from UPF 537. The 5GNR RRC in 5GNR BBU 702 determines a geographic region for UE 511 based on the location of UE 511. The 5GNR RRC in 5GNR BBU 702 determines a TTT based on the signal strength variance associated with the geographic region of UE 511. The TTT indicates the length of time UE 511 measures the reference signal for 5G MMW access node 524. Typically, the 5GNR RRC 5GNR gNodeB 523 selects a longer TTT when the signal strength variance for the geographic region of UE 511 is high. Conversely, the 5GNR RRC 5GNR gNodeB 523 selects a shorter TTT when the signal strength variance for the geographic region of UE 511 is low. 5GNR gNodeB 523 specifies the TTT in the 5GNR measurement object.

The 5GNR network applications process the new DL 5GNR signaling and the DL 5GNR data to generate corresponding DL 5GNR symbols that carry the DL 5GNR signaling and DL 5GNR data. In 5GNR radio 701, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data, and 5GNR measurement object to 5GNR UE 511.

In response to the 5GNR measurement object, UE 511 measures signal strength for 5G MMW node 524 for the amount of time specified by the TTT and wirelessly transfers the signal strength to the 5GNR RRC in BBU 602 over 5GNR radio 701. The 5GNR RRC in BBU 702 determines frequency offset and hysteresis for 5G MMW node 524. The 5GNR RRC in BBU 602 determines an inter-RAT addition threshold for 5G MMW node 524. 5GNR gNodeB 523 determines an inter-RAT addition value for 5G MMW node 524 based on the signal strength for 5G MMW node 524, the frequency offset, and the hysteresis. The 5GNR RRC in BBU 702 determines when the inter-RAT addition value for 5G MMW access node 524 is greater than the corresponding inter-RAT addition threshold. When the inter-RAT addition value for 5G MMW node 524 is greater than the inter-RAT addition threshold for 5G MMW node 524, the 5GNR RRC in BBU 702 directs 5G MMW node 524 to serve UE 511 and directs UE 511 to attach to 5G MMW node 524. The 5GNR RRC in 5GNR BBU 702 notifies 5GC AMF 536 and 5GC AMF 536 directs 5GC SMF 538 to direct 5GC UPF 537 to serve UE 511 per the quality-of-service metrics and network addressing over 5G MMW node 524. 5GNR UE 511 attaches to 5G MMW node 524. 5G MMW node 524 exchanges user data with UE 511.

The 5GNR RRC in BBU 702 also determines an inter-RAT drop threshold for 5G MMW node 524. The 5GNR RRC in BBU 702 receives a subsequent signal strength measurement from UE 511 for 5G MMW node 524. The 5GNR RRC in BBU 702 determines an inter-RAT drop value for 5G MMW node 524 based on the subsequent signal strength for 5G MMW node 524, the frequency offset, and the hysteresis. When the drop value for 5G MMW node 524 is lower than the drop threshold 5G MMW node 524, the 5GNR RRC in BBU 602 signals UE 511 to detach from 5G MMW node 524 and 5G MMW node 524 stops exchanging the user data with UE 511.

Figure 8:
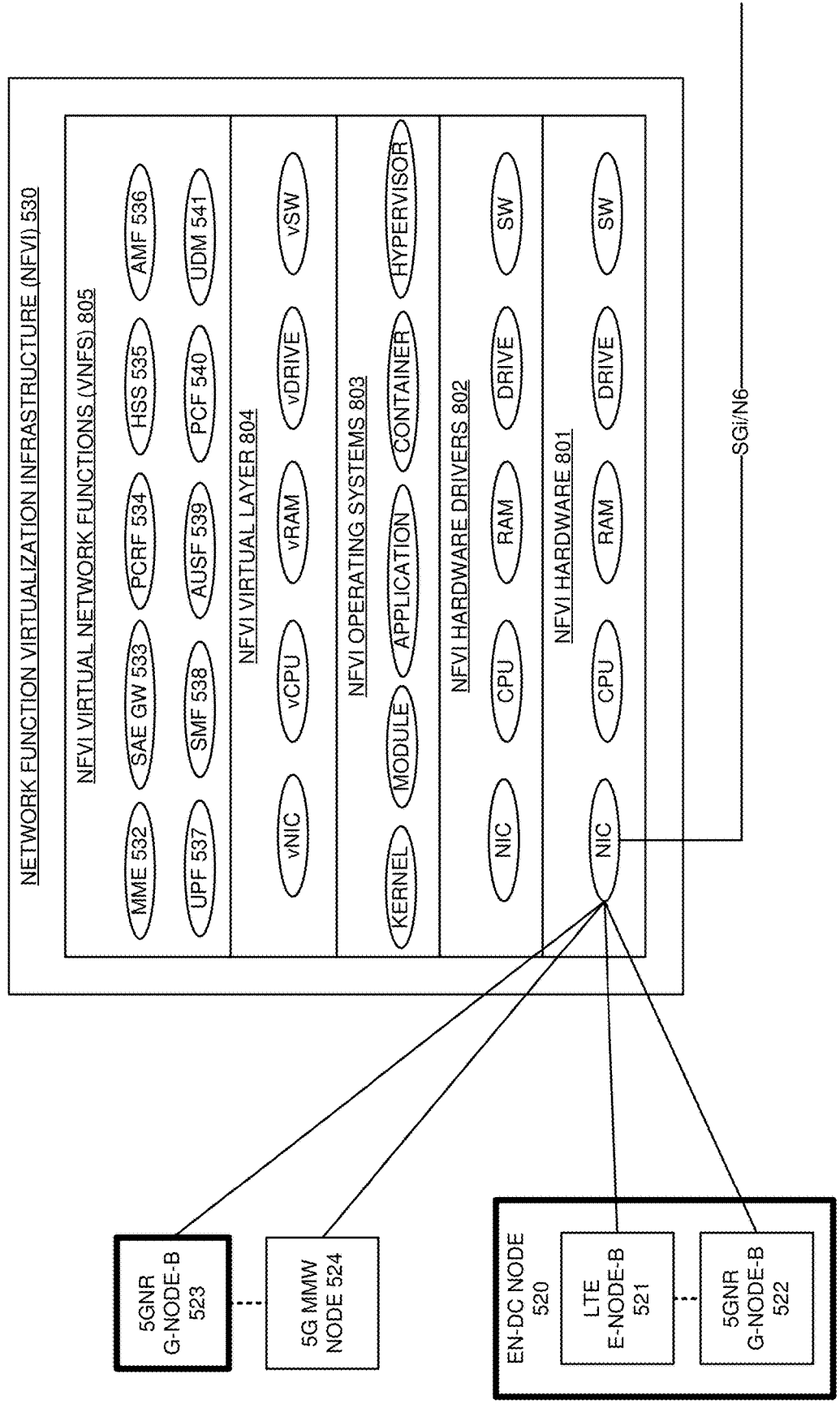
FIG. 8 illustrates a Network Function Virtualization Infrastructure (NFVI) to serve UEs over multiple wireless links based on radio metric variance.

FIG. 8 illustrates Network Function Virtualization Infrastructure (NFVI) 530 to serve UEs 510-511 over multiple wireless links based on radio metric variance. NFVI 530 is an example of network elements 150, although network elements 150 may differ. NFVI 530 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NIC), CPU, RAM, flash/disk drives, and data switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises virtual NICs (vNIC), virtual CPUs (vCPU), virtual RAM (vRAM), virtual Drives (vDRIVE), and virtual Switches (vSW). NFVI VNFs 805 comprise MME 532, SAE GW 533, PCRF 534, HSS 535, AMF 536, UPF 537, SMF 538, AUSF 539, PCF 540, and UDM 541. Other LTE VNFs and 5GC VNFs are typically present but are omitted for clarity. The NIC is coupled to EN-DC node 520, 5GNR gNodeB 523, 5G MMW node 524, and to external systems. NFVI hardware 801 executes NFVI hardware drivers 802, NFVI operating systems 803, NFVI virtual layer 804, and NFVI VNFs 805 to serve UEs 510-511 over EN-DC node 520, 5GNR gNodeB 523, and 5G MMW node 524.

MME 532 receives S1-MME signaling from LTE eNodeB 521 that requests data services for UE 510 and indicates its 5G UE capabilities. MME 532 interacts with HSS 535 to authenticate and authorize UE 510 for wireless data services that are represented by APNs. MME 532 generates a B1 measurement object for UE 510 responsive to the 5G UE capabilities and the authorization. MME 532 transfers the APNs for UE 510 to SAE GW 533. AE GW 533 interacts with PCRF 534 to select QCIs and network addresses for UE 510 based on the APNs. SAE GW 533 transfers the APNs, QCIs, and addresses to MME 532. MME 532 transfers the APNs, QCIs, network addresses, and B1 measurement object for UE 510 to LTE eNodeB 521. MME 532 receives S1-MME signaling from LTE eNodeB 521 for UE 510. SAE GW 533 533 exchanges user data for UE 510 with external systems. SAE GW 533 exchanges the user with LTE eNodeB 521 and 5GNR gNodeB 522.

AMF 536 receives N2 signaling from 5GNR gNodeB 523 that requests data service for UE 511 and indicates its 5G UE capabilities. AMF 536 interacts with SMF 538, AUSF 539, PCF 540, and UDM 541 to authenticate and authorize 5GNR UE 511 for 5G data services. AMF 536 generates a 5GNR measurement object responsive to the 5G UE capabilities and the authorization. AMF 536 transfers quality-of-service metrics, network addressing, and the 5GNR measurement object for 5GNR UE 511 to 5GNR gNodeB 523. SMF 538 directs UPF 537 to serve UE 511 over 5GNR gNodeB 523 per the quality-of-service metrics and network addressing. AMF 537 receives N2 signaling from 5GNR gNodeB 523 indicating attachments per the 5G measurement object. AMF 536 directs SMF 538 drive UPF 537 to serve UE 511 over 5G MMW node 524 per the quality-of-service metrics and network addressing.

Figure 9:
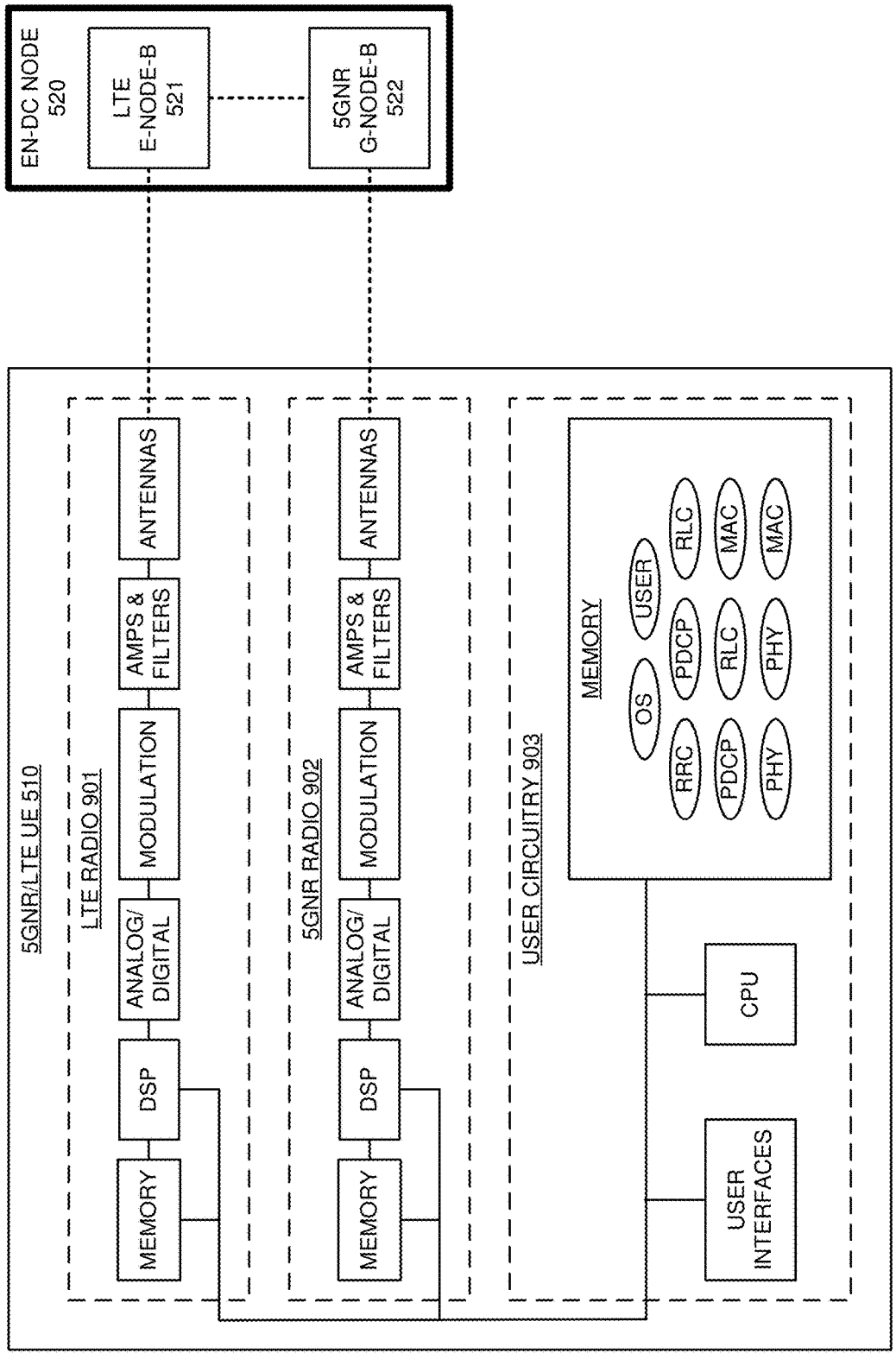
FIG. 9 illustrates a 5GNR/LTE UE that is served by the EN-DC access node based on radio metric variance.

FIG. 9 illustrates 5GNR/LTE UE 510 that is served by EN-DC access node 520 over 5GNR based on radio metric variance. 5GNR/LTE UE 510 is an example of UE 101, although UE 101 may differ. UE 510 comprises LTE radio 901, 5GNR radio 902, and user circuitry 903 that are coupled over bus circuitry. Radios 901-903 comprise antennas, amplifiers, filters, modulation, analog-to-digital interfaces, DSP, and memory that are coupled over bus circuitry. User circuitry 903 comprises user interfaces, CPU, and memory that are coupled over bus circuitry.

The antennas in radios 901 and 902 are wirelessly coupled to LTE eNodeB 521 and 5GNR gNodeB 522. The user interfaces in user circuitry 903 comprise graphic displays, machine controllers, sensors, cameras, transceivers, and/or some other user components. The memory in user circuitry 903 stores an operating system, user applications (USER), and network applications (PHY, MAC, RLC, PDCP, and RRC). The CPU in user circuitry 903 executes the operating system and the user applications to generate and consume user data. The CPU in user circuitry 903 executes the operating system and the network applications to wirelessly exchange corresponding signaling and data with LTE eNodeB 521 and 5GNR gNodeB 522 over radios 901 and 903.

The LTE RRC in UE 510 wirelessly attaches to LTE eNodeB 521 over antennas in LTE radio 901. The LTE RRC in UE 510 generates UL LTE signaling and UL LTE data. The UL signaling indicates 5G capabilities for UE 510 and the location of UE 510. The LTE network applications in UE 510 process the UL LTE signaling and the UL LTE data to generate corresponding UL LTE symbols that carry the UL LTE signaling, UL LTE data, 5G UE capabilities, and UE location. The LTE DSP in LTE radio 901 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5G UE capabilities) and UL LTE data for UE 510 to LTE eNodeB 521.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates a B1 measurement object, APNs, QCIs, and network addresses from LTE eNodeB 521.

In response to the B1 measurement object, the LTE RRC in UE 510 directs the 5GNR PHY to measure 5GNR signal strength from 5GNR gNodeB 522 for the length of time specified by the TTT of the B1 measurement object. The 5GNR PHY reports the 5GNR signal strength to the LTE RRC. The LTE RRC in UE 510 transfers the 5GNR signal strength to LTE eNodeB 521. LTE eNodeB 521 determines a B1 addition threshold for 5GNR gNodeB 522. LTE eNodeB 521 determines an inter-RAT addition value based on the 5GNR signal strength. When the inter-RAT addition value is greater than the B1 addition threshold, LTE eNodeB 521 directs the 5GNR PDCP in UE 510 to attach to 5GNR gNodeB 522. 5GNR gNodeB 522 exchanges user data for UE 510 with the 5GNR PDCP in UE 510.

LTE eNodeB 521 determines a B1 drop threshold for 5GNR gNodeB 522. The LTE RRC in UE 510 directs the 5GNR PHY to measure subsequent 5GNR signal strength of 5GNR gNodeB 522 for the length of time specified by the TTT of the B1 measurement object. The 5GNR PHY reports the subsequent signal strength to the LTE RRC. The LTE RRC in UE 510 wirelessly transfers the subsequent 5GNR signal strength to LTE eNodeB 521. LTE eNodeB 521 determines an inter-RAT drop value for 5GNR gNodeB 522 based on the subsequent 5GNR signal strength. When the inter-RAT drop value for 5GNR gNodeB 522 is lower than the B1 drop threshold for 5GNR gNodeB 522, LTE eNodeB 521 signals the 5GNR PDCP in UE 510 to detach from 5GNR gNodeB 522. The 5GNR PDCP in UE 510 detaches from 5GNR gNodeB 522.

Figure 10:
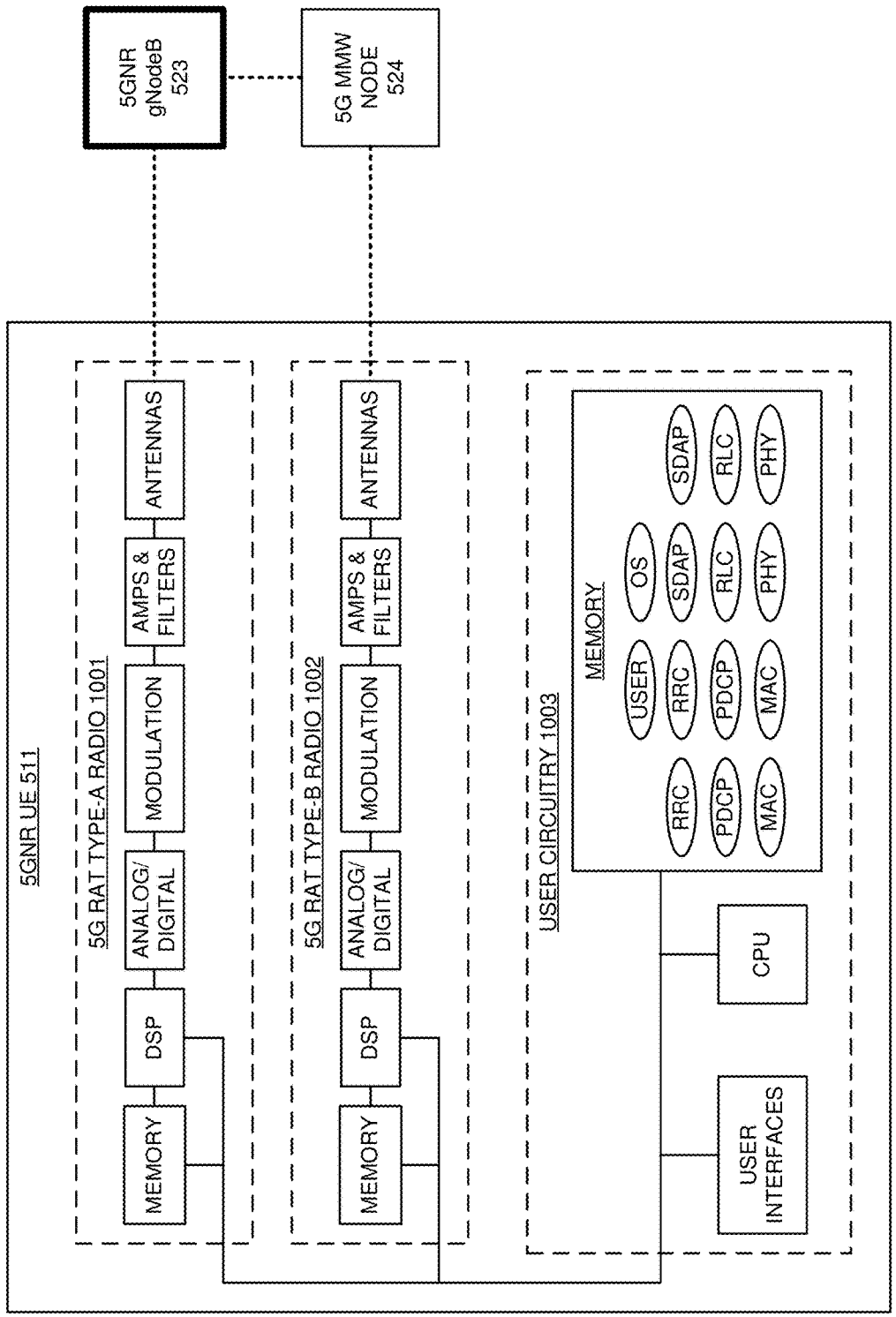
FIG. 10 illustrates a 5GNR UE that is served by the 5GNR gNodeB over multiple wireless links based on radio metric variance.

FIG. 10 illustrates 5GNR UE 511 that is served by 5GNR gNodeB 523 based on radio metric variance. 5GNR UE 511 is an example of UE 101, although UE 101 may differ. UE 511 comprises 5GNR radio 1001, 5G MMW radio 1002, and user circuitry 1003 that are coupled over bus circuitry. 5GNR radio 1001 and 5G MMW radio 1002 comprise antennas, amplifiers, filters, modulation, analog-to-digital interfaces, DSP, and memory that are coupled over bus circuitry. User circuitry 1003 comprises user interfaces, CPU, and memory that are coupled over bus circuitry. The antennas in 5GNR radio 1001 are wirelessly coupled to 5GNR gNodeB 523. The antennas in 5G MMW radio 1002 are wirelessly coupled to 5G MMW node 524. The user interfaces in user circuitry 1003 comprise graphic displays, machine controllers, sensors, cameras, transceivers, and/or some other user components. The memory in user circuitry 1003 stores an operating system, user applications, and network applications (PHY, MAC, RLC, PDCP, SDAP, and RRC). The CPU in user circuitry 1003 executes the operating system and the user applications to generate and consume user data. The CPU in user circuitry 1003 executes the operating system and the network applications to wirelessly exchange corresponding signaling and data with 5GNR gNodeB 523 over 5GNR radio 1001 and with 5G MMW node 524 over 5G MMW radio 1002.

The 5GNR RRC in UE 511 wirelessly attaches to 5GNR gNodeB 523 over antennas in 5GNR radio 1001. The 5GNR RRC generates 5GNR signals that transport UL 5GNR signaling and UL 5GNR data. The 5GNR signaling indicates 5G capabilities for UE 511 and the location of UE 511. The 5GNR network applications in UE 511 process the UL 5GNR signaling and the UL 5GNR data to generate corresponding UL 5GNR symbols that carry the UL 5GNR signaling and UL 5GNR data. The 5GNR DSP in 5GNR radio 1001 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the 5G capabilities and location) and UL 5GNR data for UE 511 to 5GNR gNodeB 523.

The 5GNR antennas 5GNR radio 1001 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 511 execute the network applications to process the DL 5GNR symbols and recover the DL 5GNR signaling having the 5GNR measurement object, QoS levels, network addresses, and the like and the DL 5GNR data.

In response to the TTT of the 5GNR measurement object, the 5GNR RRC in UE 511 directs the MMW PHY in UE 511 to measure MMW signal strength for 5G MMW node 524 for the amount of time specified by the TTT. The MMW PHY reports the signal strength to the 5GNR RRC. The 5GNR RRC wirelessly transfers the signal strength for 5G MMW node 524 to 5GNR gNodeB 523. When the inter-RAT addition value is greater than the inter-RAT addition threshold for 5G MMW node 524, 5GNR gNodeB 523 directs the MMW RRC in UE 511 to attach to 5G MMW node 524. The MMW RRC in 5GNR UE 511 attaches to 5G MMW node 524 over 5G MMW radio 902. 5G MMW node 524 exchanges user data with the MMW SDAP.

The 5GNR RRC in UE 511 directs the 5G MMW PHY in UE 511 to measure subsequent signal strength for 5G MMW node 524 for the amount of time specified by the TTT in the 5GNR measurement object. The MMW PHYs report the subsequent MMW signal strength to the 5GNR RRC. The 5GNR RRC wirelessly transfers the subsequent signal strength to 5GNR gNodeB 523. When the drop value is lower than the drop threshold for MMW node 524, the 5GNR RRC in 5GNR gNodeB 523 signals the MMW RRC in UE 511 to detach from 5G MMW node 524. 5G MMW node 524 to stops exchanging the user data with UE 511.

Figure 11:
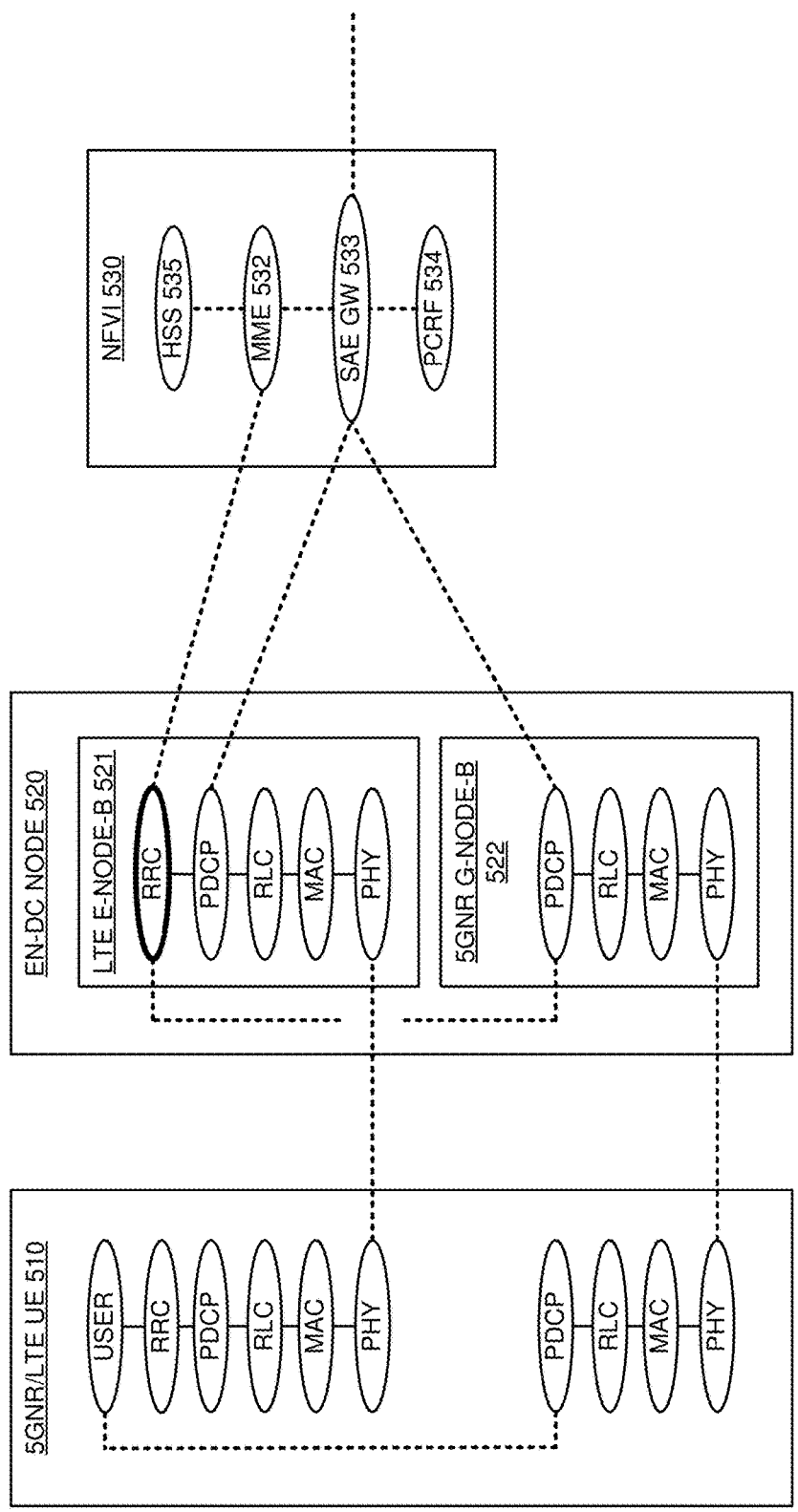
FIG. 11 illustrates an exemplary operation of the UEs, the EN-DC access node, and the NFVI to serve the 5GNR/LTE UE over multiple wireless links based on radio metric variance.

FIG. 11 illustrates an exemplary operation of 5GNR/LTE UE 510, EN-DC access node 520, and NFVI 530 to serve 5GNR/LTE UE 510 over multiple wireless links based on radio metric variance. The LTE RRC in LTE eNodeB 521 receives B1 measurement reports indicating signal strength for 5GNR gNodeB 522 at different locations. The LTE RRC in LTE eNodeB 521 determines variances in the signal strength measurements for the different locations. The LTE RRC in LTE eNodeB 521 determines geographic regions and an average signal strength variance for each of the different geographic regions based on the variances in the signal strength measurements for the different locations.

In 5GNR/LTE UE 510, a user application requests data communication, and the LTE RRC in UE 510 attaches to the LTE RRC in LTE eNodeB 521 over the LTE PDCPs, RLCs, MACs, and PHYs. The LTE RRC in UE 510 indicates 5G capabilities for UE 510 and the location of UE 510 to the LTE RRC in LTE eNodeB 521. The LTE RRC in LTE eNodeB 521 transfers S1-MME signaling to MME 532 that requests data services and indicates the 5G capabilities for UE 510. MME 532 interacts with HSS 535 to authenticate and authorize UE 510 for wireless data services by APNs. MME 532 generates a B1 measurement object for UE 510 in response to the 5G authorization and the 5G capabilities. MME 532 transfers the APNs for UE 510 to SAE GW 533. SAE GW 533 interacts with PCRF 534 to select QCIs and network addresses for UE 510 based on the APNs. SAE GW 533 transfers the APNs, QCIs, and addresses to MME 532. MME 532 transfers the APNs, QCIs, network address, and the B1 measurement object for UE 510 to the LTE RRC in LTE eNodeB 521.

LTE eNodeB 521 determines a geographic region for UE 510 based on the location of UE 510. LTE eNodeB 521 determines a Time-To-Trigger (TTT) for UE 510 based on the signal strength variance for the geographic region of UE 510. The TTT indicates the length of time UE 510 measures the signal strength for 5GNR gNodeB 522. Typically, the LTE RRC in LTE eNodeB 521 selects a longer TTT when the signal strength variance for the geographic region of UE 510 is high. Conversely, the LTE RRC in LTE eNodeB 521 selects a shorter TTT when the signal strength variance for the geographic region of UE 510 is low. LTE SAE GW 533 exchanges user data for UE 510 with external systems. SAE GW 533 exchanges the user data with LTE eNodeB 521. LTE eNodeB 521 exchanges the user data with UE 510. The RRC in LTE eNodeB 521 transfers the APNs, QCIs, network address, and B1 measurement object to the LTE RRC in UE 510 over the PDCPs, RLCs, MACs, and PHYs. SAE GW 533 exchanges the user data with the PDCP in LTE eNodeB 521. The PDCP in LTE eNodeB 521 exchanges the user data with the LTE PDCP in UE 510 over the RLCs, MACs, and PHYs.

In response to the B1 measurement object, the LTE RRC in UE 510 directs the 5GNR PHY to measure 5GNR signal strength for 5GNR gNodeB 522 for the length of time specified by the TTT. The 5GNR PHY reports the signal strength to the LTE RRC in UE 510. The LTE RRC in UE 510 transfers the 5GNR signal strength to the LTE RRC in LTE eNodeB 521. The LTE RRC in LTE eNodeB 521 determines frequency offset and hysteresis for 5GNR gNodeB 522. The LTE RRC in LTE eNodeB 521 determines a B1 addition threshold for 5GNR gNodeB 522. The LTE RRC in LTE eNodeB 521 determines an inter-RAT addition value for 5GNR gNodeB 522 based on the 5GNR signal strength, the frequency offset, and the hysteresis. The LTE RRC in LTE eNodeB 521 determines when the inter-RAT addition value is greater than the B1 addition threshold. When the inter-RAT addition value for 5GNR gNodeB 522 is greater than the B1 addition threshold for 5GNR gNodeB 522, the LTE RRC in LTE eNodeB 521 directs the 5GNR PDCP in 5GNR gNodeB 522 to serve UE 510. The LTE RRC in eNodeB 521 directs the 5GNR PDCP in UE 510 to attach to the 5GNR PDCP in 5GNR gNodeB 522 over the 5GNR RLCs, MACs, and PHYs. The 5GNR PDCP attaches to the 5GNR PDCP in 5GNR gNodeB 522.

The PDCP in 5GNR gNodeB 522 requests 5GNR service for UE 510 from the LTE RRC in LTE eNodeB 521 over X2 signaling. The LTE RRC in LTE eNodeB 521 requests the 5GNR service for UE 510 from MME 532 over S1-MME signaling. MME 532 directs SAE GW 533 to serve UE 510 over 5GNR gNodeB 522. MME 532 transfers the APNs, QCIs, and network address for UE 510 to the RRC in LTE eNodeB 521. The LTE RRC in LTE eNodeB 521 transfers the APNs, QCIs, and network address to the 5GNR PDCP in 5GNR gNodeB 522 over X2 signaling. The PDCP in 5GNR gNodeB 522 transfers the APNs, QCIs, and network address to the PDCP in UE 510 over the RLCs, MACs, and PHYs. SAE GW 533 exchanges user data for UE 510 with external systems. SAE GW 533 exchanges the user data with the PDCP in 5GNR gNodeB 522. The 5GNR PDCP in 5GNR gNodeB 522 exchanges the user data with the 5GNR PDCP in UE 510 over the RLCs, MACs, and PHYs.

Figure 12:
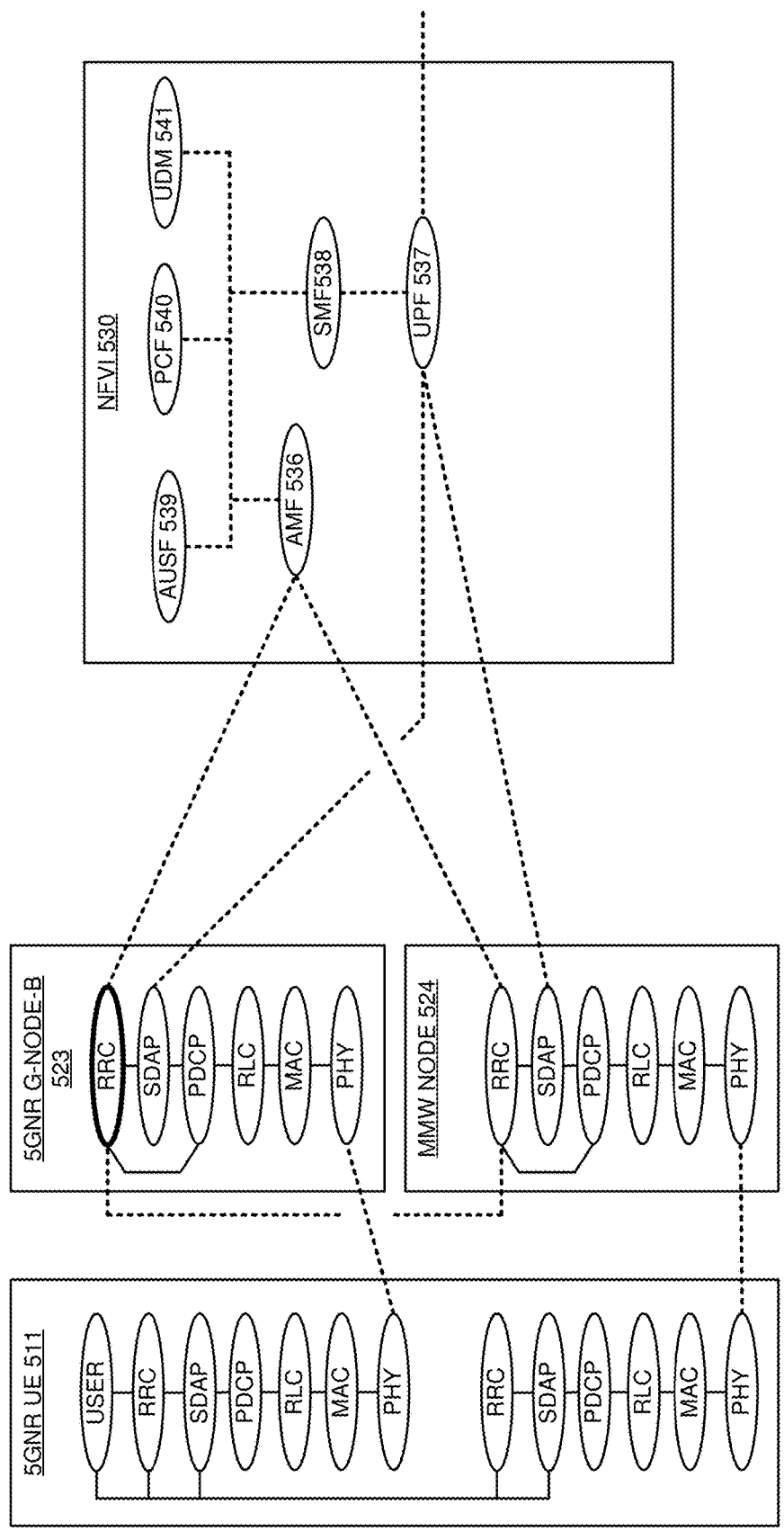
FIG. 12 illustrates an exemplary operation of the UEs, the 5GNR gNodeB, a 5G MMW access node, and the NFVI to serve the 5GNR UE over multiple wireless links based on radio metric variance.

The RRC in LTE eNodeB 521 determines a B1 drop threshold for 5GNR gNodeB 522. The LTE RRC in UE 510 directs the 5GNR PHYs to measure subsequent 5GNR signal strength. The PHYs report the signal strength to the LTE RRC in UE 510. The LTE RRC in UE 510 transfers the subsequent signal strength to the LTE RRC in LTE eNodeB 521 over the PDCPs, RLCs, MACs, and PHYs. The LTE RRC in LTE eNodeB 521 determines an inter-RAT drop value for 5GNR gNodeB 522 based on the subsequent 5GNR signal strength. The LTE RRC in LTE eNodeB 521 determines when the inter-RAT drop value is less than the B1 drop threshold. When the inter-RAT drop values is less than the B1 drop threshold, the LTE RRC in LTE eNodeB 521 directs the 5GNR PDCP in 5GNR gNodeB 522 to stop serving UE 510 and notifies MME 532. The LTE RRC in LTE eNodeB 521 directs the 5GNR PDCP in UE 510 to detach. UE 510 detaches from 5GNR gNodeB 522. MME 532 directs SAE GW 533 to stop serving UE 510 over 5GNR gNodeB 522. SAE GW 533 stops exchanging 5GNR data with the 5GNR PDCP in 5GNR gNodeB 522. The PDCP in 5GNR gNodeB 522 stops exchanging the data with the PDCP in UE 510 over the RLCs, MACs, and PHYs FIG. 12 illustrates an exemplary operation of UE 511, 5GNR gNodeB 523, 5G MMW node 524, and NFVI 530 to serve UE 511 over multiple wireless links based on radio metric variance. The 5GNR RRC in 5GNR gNodeB 523 receives 5GNR inter-RAT measurement reports indicating signal strength for MMW gNodeB 524 at different locations. The 5GNR RRC in 5GNR gNodeB 523 determines variances in the signal strength measurements for the different locations. The 5GNR RRC in 5GNR gNodeB 523 determines geographic regions and an average signal strength variance for each of the different geographic regions based on the variances in the signal strength measurements for the different locations.

In 5GNR UE 511, a user application requests data communication, and the 5GNR RRCs in UE 511 attach to the 5GNR RRC in 5GNR gNodeB 523 over the 5GNR PDCPs, RLCs, MACs, and PHYs. The 5GNR RRC in UE 511 indicates 5G UE capabilities for the multiple types of 5G RAT and the location of UE 511 to the 5GNR RRC in 5GNR gNodeB 523. The 5GNR RRC in 5GNR gNodeB 523 sends a request for data services for 5GNR UE 511 in N2 signaling to AMF 536 over the backhaul links. AMF 536 interacts with SMF 538, AUSF 539, PCF 540, UDM 541, and typically other functions to authenticate and authorize 5GNR UE 511 for 5G data services. SMF 538 directs UPF 537 to serve UE 511 per the quality-of-service metrics and network addressing. AMF 536 generates a 5GNR measurement object for UE 511 responsive to the 5G authorization and 5G UE capabilities. AMF 536 transfers quality-of-service metrics, network addressing, and the 5GNR measurement object for UE 511 to the 5GNR RRC in 5GNR gNodeB 523 in N2 signaling.

The 5GNR RRC in 5GNR gNodeB 523 determines a geographic region for UE 511 based on the location of UE 511. The 5GNR RRC in 5GNR gNodeB 523 determines a TTT for UE 511 based on the signal strength variance associated with the geographic region of UE 511. The TTT indicates the length of time UE 511 measures signal strength for 5G MMW access node 524. Typically, the 5GNR RRC in 5GNR gNodeB 523 selects a longer TTT when the signal strength variance for the geographic region of UE 511 is high. Conversely, the 5GNR RRC in 5GNR gNodeB 523 selects a shorter TTT when the signal strength variance for the geographic region of UE 511 is low. The 5GNR RRC in 5GNR gNodeB 523 specifies the TTT in the 5GNR measurement object and transfers the selected APNs, QCIs, network addresses, and 5GNR measurement object to the 5GNR RRC in UE 511 over the PDCPs, RLCs, MACs, and PHYs.

In response to the 5GNR measurement object, the 5GNR RRC in UE 511 directs the MMW PHY to measure the signal strength for 5G MMW node 524 for the amount of time specified by the TTT. The MMW PHY reports the signal strength to the 5GNR RRC in UE 511. The 5GNR RRC wirelessly transfers the signal strength to the 5GNR RRC in 5GNR gNodeB 523 over the PDCPs, RLCs, MACs, and PHYs. The 5GNR RRC in 5GNR gNodeB 523 determines the frequency offset, and the hysteresis for 5G MMW node 524. The 5GNR RRC in 5GNR gNodeB 523 determines an inter-RAT addition threshold for 5G MMW node 524.

The 5GNR RRC in 5GNR gNodeB 523 determines an inter-RAT addition values for 5G MMW node 524 based on the MMW signal strength. The 5GNR RRC in 5GNR gNodeB 523 determines when the inter-RAT addition value is greater than the inter-RAT addition threshold. When the 5GNR RRC in 5GNR gNodeB 523 determines the inter-RAT addition value is greater than the inter-RAT addition threshold for 5G MMW node 524, the 5GNR RRC in 5GNR gNodeB 523 directs the MMW RRC in 5G MMW node 524 to serve UE 511. The 5GNR RRC in 5GNR gNodeB 523 directs UE 511 to attach to 5G MMW node 524. The MMW RRC in UE 511 attaches to the RRC in 5G MMW node 524 over the PDCPs, RLCs, MACs, and PHYs. The MMW RRC in 5G MMW node 524 requests MMW service for UE 511 from AMF 536. UPF 537 exchanges user data for UE 511 with external systems. UPF 537 exchanges the user data with the SDAPs in 5G MMW node 524. The SDAPs in 5G MMW node 524 exchange the user data with the SDAPs in 5GNR UE 511 over the PDCPs, RLCs, MACs, and PHYs. The SDAPs in UE 511 exchange the user data with the user applications.

The 5GNR RRC in 5GNR gNodeB 523 determines an inter-RAT drop threshold for 5G MMW node 524. The 5GNR RRC in UE 511 direct the PHYs in UE 511 to measure subsequent signal strength for 5G MMW node 524. The PHYs report the subsequent signal strength to the 5GNR RRC. The 5GNR RRC in UE 511 transfers the subsequent signal strength to the 5GNR RRC in 5GNR gNodeB 523. The 5GNR RRC in 5GNR gNodeB 523 determines an inter-RAT drop value for 5G MMW node 524 based on the subsequent signal strength. The 5GNR RRC in 5GNR gNodeB 523 determines when the inter-RAT drop value is less than the inter-RAT drop threshold. When the inter-RAT drop value for MMW node 524 is less than the inter-RAT drop threshold, the 5GNR RRC in 5GNR gNodeB 523 directs the MMW RRC in 5G MMW node 524 to stop serving UE 511 and directs the MMW RRC in UE 511 to detach from the MMW RRC in 5G MMW node 524. The RRC in 5G MMW node 524 stops exchanging the user data with the RRC in UE 511 over their PDCPs, RLCs, MACs, and PHYs.

The wireless data network circuitry described above comprises computer hardware and software that form special-purpose network circuitry to serve wireless UEs over multiple wireless links based on radio metric variance. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on radio metric variance.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a primary access node to add a secondary access node to deliver wireless communication service, the method comprising:
   a radio wirelessly receiving measurement reports from a sample set of User Equipment (UEs) characterizing a radio metric for the secondary access node and transferring the measurement reports to baseband circuitry;
   the baseband circuitry receiving and processing the measurement reports and responsively determining radio metric variances at different locations;
   the radio wirelessly exchanging user signaling with a new UE and exchanging the user signaling with the baseband circuitry;
   the baseband circuitry determining one of the different locations for the new UE, determining a measurement time period for the new UE based on the one of the radio metric variances at the one of the different locations, and transferring the measurement time period to the radio;

the radio wirelessly transferring the measurement time period to the new UE, wirelessly receiving a new measurement report from the new UE indicating the radio metric for the secondary access node, and transferring the new measurement report to the baseband circuitry, wherein the new UE measured a wireless signal from the secondary access node for the measurement time period to generate the new measurement report;

the baseband circuitry receiving and processing the new measurement report, determining to add the secondary access node based on the radio metric for the secondary access node in the new measurement report, and transferring network signaling to the secondary access node to serve the new UE and transferring additional user signaling to the radio; and the radio wirelessly transfers the additional user signaling to the new UE to attach to the secondary access node, wherein the secondary access node delivers the wireless communication service to the new UE responsive to the network signaling;

wherein the primary access node comprises a 5GNR gNodeB and the secondary access node comprises a Millimeter Wave (MMW) access node.

2. The method of claim 1 wherein the baseband circuitry determining the radio metric variances at the different locations comprises:

determining different geographic regions having individual radio metric variance values; and determining to add the secondary access node comprises determining to add the secondary access node based on one of the individual radio metric variance values for the one of the different locations for the new UE.

3. The method of claim 2 wherein the geographic regions comprise geographic volumes.

4. The method of claim 1 wherein the baseband circuitry determining the measurement time period for the new UE based on the one of the radio metric variances at the one of the different locations comprises increasing the measurement time period when the one of the radio metric variances is greater than an average radio metric variance.

5. The method of claim 1 wherein the baseband circuitry determining the measurement time period for the new UE based on the one of the radio metric variances at the one of the different locations comprises decreasing the measurement time period when the one of the radio metric variances is less than the average radio metric variance.

6. The method of claim 1 wherein the baseband circuitry determining to add the secondary access node based on the radio metric for the secondary access node in the new measurement report comprises determining to add the secondary access node based on applying the radio metric to an inter-Radio Access Technology (inter-RAT) node addition threshold.

7. The method of claim 1 wherein the baseband circuitry transferring the measurement time period comprises transferring a Fifth Generation New Radio (5GNR) measurement object.

8. The method of claim 1 wherein the radio metric comprises at least one of Receive Signal Receive Power (RSRP) and Receive Signal Receive Quality (RSRQ).

9. The method of claim 1 wherein the primary access node comprises a Long Term Evolution (LTE) eNodeB and the secondary access node comprises a 5GNR gNodeB.

10. A primary access node configured to add a secondary access node to deliver wireless communication service, the primary access node comprising:

a radio wirelessly configured to receive measurement reports from a sample set of User Equipment (UEs) characterizing a radio metric for the secondary access node and transfer the measurement reports to baseband circuitry;

the baseband circuitry configured to receive and process the measurement reports and responsively determine radio metric variances at different locations;

the radio configured to wirelessly exchange user signaling with a new UE and exchange the user signaling with the baseband circuitry;

the baseband circuitry configured to determine one of the different locations for the new UE, determine a measurement time period for the new UE based on the one of the radio metric variances at the one of the different locations, and transfer the measurement time period to the radio;

the radio configured to wirelessly transfer the measurement time period to the new UE, wirelessly receive anew measurement report from the new UE indicating the radio metric for the secondary access node, and transfer the new measurement report to the baseband circuitry, wherein the new UE measured a wireless signal from the secondary access node for the measurement time period to generate the new measurement report;

the baseband circuitry configured to receive and process the new measurement report, determine to add the secondary access node based on the radio metric for the secondary access node in the new measurement report, and transfer network signaling to the secondary access node to serve the new UE and transfers additional user signaling to the radio; and the radio wirelessly transfers the additional user signaling to the new UE to attach to the secondary access node, wherein the secondary access node delivers the wireless communication service to the new UE responsive to the network signaling;

wherein the primary access node comprises a 5GNR gNodeB and the secondary access node comprises a Millimeter Wave (MMW) access node.

11. The primary access node of claim 10 wherein the baseband circuitry configured to determine the radio metric variances at the different locations comprises:

the baseband circuitry configured to determine different geographic regions having individual radio metric variance values; and the baseband circuitry configured to determine to add the secondary access node based on one of the individual radio metric variance values for the one of the different locations for the new UE.

12. The primary access node of claim 11 wherein the geographic regions comprise geographic volumes.

13. The primary access node of claim 10 wherein the baseband circuitry configured to determine the measurement time period for the new UE based on the one of the radio metric variances at the one of the different locations comprises the baseband circuitry configured to increase the measurement time period when the one of the radio metric variances is greater than an average radio metric variance.

14. The primary access node of claim 10 wherein the baseband circuitry configured to determine the measurement time period for the new UE based on the one of the radio metric variances at the one of the different locations comprises the baseband circuitry configured to decrease the measurement time period when the one of the radio metric variances is less than the average radio metric variance.

15. The primary access node of claim 10 wherein the baseband circuitry configured to determine to add the secondary access node based on the radio metric for the secondary access node in the new measurement report comprises the baseband circuitry configured to determine to add the secondary access node based on applying the radio metric to an inter-Radio Access Technology (inter-RAT) node addition threshold.

16. The primary access node of claim 10 wherein the baseband circuitry configured to transfer the measurement time period comprises the baseband circuitry configured to transfer a Fifth Generation New Radio (5GNR) measurement object.

17. The primary access node of claim 10 wherein the radio metric comprises at least one of Receive Signal Receive Power (RSRP) and Receive Signal Receive Quality (RSRQ).

18. The primary access node of claim 10 wherein the primary access node comprises a Long Term Evolution (LTE) eNodeB and the secondary access node comprises a 5GNR gNodeB.

\* \* \* \* \*